US 6,725,195 B2

(12) United States Patent
Sankar et al.

(10) Patent No.: US 6,725,195 B2
(45) Date of Patent: Apr. 20, 2004

(54) METHOD AND APPARATUS FOR PROBABILISTIC RECOGNITION USING SMALL NUMBER OF STATE CLUSTERS

(75) Inventors: Ananth Sankar, Palo Alto, CA (US); Venkata Ramana Rao Gadde, Santa Clara, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 10/029,420

(22) Filed: Oct. 22, 2001

(65) Prior Publication Data

US 2003/0040906 A1 Feb. 27, 2003

Related U.S. Application Data

(63) Continuation of application No. 09/379,411, filed on Aug. 24, 1999, now abandoned.
(60) Provisional application No. 60/097,789, filed on Aug. 25, 1998.

(51) Int. Cl.[7] ............................................. G10L 15/14
(52) U.S. Cl. ..................... 704/240; 704/245; 704/256
(58) Field of Search ................................. 704/231, 240, 704/243, 244, 245, 251, 256

(56) References Cited

U.S. PATENT DOCUMENTS

| 5,450,523 A | * | 9/1995 | Zhao | 704/240 |
|---|---|---|---|---|
| 5,787,396 A | * | 7/1998 | Komori et al. | 704/255 |
| 5,825,978 A | * | 10/1998 | Digalakis et al. | 704/245 |
| 5,864,810 A | * | 1/1999 | Digalakis et al. | 704/254 |
| 6,006,186 A | * | 12/1999 | Chen et al. | 704/249 |
| 6,009,390 A | * | 12/1999 | Gupta et al. | 704/240 |
| 6,064,958 A | * | 5/2000 | Takahashi et al. | 704/243 |
| 6,092,045 A | * | 7/2000 | Stubley et al. | 704/254 |
| 6,182,037 B1 | * | 1/2001 | Maes | 704/245 |
| 6,256,607 B1 | * | 7/2001 | Digalakis et al. | 704/222 |

FOREIGN PATENT DOCUMENTS

| WO | | 96/02912 | * | 2/1996 | G10L/5/06 |
|---|---|---|---|---|---|
| WO | WO | 96/02912 | * | 2/1996 | G10L/5/06 |

OTHER PUBLICATIONS

X. Huang and M. Jack, "Semi–Continuous Hidden Markov Models for Speech Signals," *Computer Speech and Language*, vol. 3, pp. 239–252, 1989.

J. Bellagarda and D. Nahamoo, "Tied Mixture Continuous Parameter Modeling for Speech Recognition," *IEEE Transactions on Acoustics, Speech, and Signal Processing*, vol. 38, pp. 2033–2045, Dec. 1990.

D. Paul, "The Lincoln Robust Continuous Speech Recognizer," in *Proceedings IEEE International Conference on Acoustics, Speech, and Signal Processing*, pp. 449–452, May 1989.

M.Y. Hwang, X. Huang, and F. Alleva, "Predicting Unseen Triphones with Senones," in *Proceedings IEEE International Conference on Acoustics, Speech, and Signal Processing*, pp. II–311–II–314, 1993.

(List continued on next page.)

Primary Examiner—Tãlivaldis Ivars Šmits
Assistant Examiner—Abul K. Azad
(74) Attorney, Agent, or Firm—Moser, Patterson & Sheridan, LLP.; Kin-Wah Tong, Esq

(57) ABSTRACT

Probabilistic recognition using clusters and simple probability functions provides improved performance by employing a limited number of clusters each using a relatively large number of simple probability functions. The simple probability functions for each of the limited number of state clusters are greater in number than the limited number of state clusters.

18 Claims, 2 Drawing Sheets

OTHER PUBLICATIONS

P. Woodland, J. Odell, V. Valtchev, and S. Young, "Large Vocabulary Continuous Speech Recognition Using HTK," in *Proceedings IEEE International Conference on Acoustics, Speech, and Signal Processing*, pp. II–125–II–128, 1994.

V. Digalakis and H. Murveit, "High Accuracy Large Vocabulary Speech Recognition Using Mixture Tying and Consistency Modeling," in *Proceedings of the DARPA Human Language Technology Workshop*, (Plainsboro, NJ), 1994.

V. Digalakis, P. Monaco, and H. Murveit, "Genones: Generalized Mixture Tying in Continuous Hidden Markov Model Based Speech Recognizers," *IEEE Transactions on Speech and Audio Processing*, vol. 4, No. 4, pp. 281–289, 1996.

O. Kimball and M. Ostendorf, "On the Use of Tied–Mixture Distributions," in *Proceedings of the DARPA Human Language Technology Workshop*, (Plainsboro, NJ), 1993.

D. B. Paul, "The Lincoln Large Vocabulary Stack–Decoder Based HMM CSR," in *Proceedings of the DARPA Human Language Technology Workshop*, pp. 399–404, 1994.

A. Sankar, "Experiments with a Gaussian Merging–Splitting Algorithm for HMM training for Speech Recognition," in *Proceedings of DARPA Speech Recognition Workshop*, (Lansdowne, VA), Feb. 1998.

S. Young and P. Woodland, "The Use of State Tying in Continuous Speech Recognition," in *Proceedings of EUROSPEECH*, pp. 2203–2206, 1993.

A. Sankar and C.H. Lee, "Stochastic Matching for Robust Speech Recognition," *IEEE Signal Processing Letters*, vol. 1, pp. 124–125, Aug. 1994.

A. Sankar and C.H. Lee, "A Maximum–Likelihood Approach to Stochastic Matching for Robust Speech Recognition," *IEEE Transactions on Speech and Audio Processing*, vol. 4, pp. 190–202, May 1996.

V. Digalakis, D. Rtischev, and L. Neumeyer, "Speaker Adaptation Using Constrained Reestimation of Gaussian Mixtures," *IEEE Transactions on Speech and Audio Processing*, vol. 3, No. 5, pp. 357–366, 1995.

C. J. Legetter and P. C. Woodland, "Flexible Speaker Adaptation Using Maximum Likelihood Linear Regression," in *Proceedings of the Spoken Language Systems Technology Workshop*, pp. 110–115, 1995.

Y. Linde, A. Buzo, and R. Gray, "An Algorithm for Vector Quantizer Design," *IEEE Transactions on Communications*, vol. COM28, pp. 84–95, Jan. 1980.

H. Murveit, J. Butzberger, V. Digalakis, and M. Weintraub, "LargeVocabulary Dictation Using SRI's Decipher(TM) Speech Recognition System: ProgressiveSearch Techniques," in *Proceedings IEEE International Conference on Acoustics, Speech, and Signal Processing*, pp. II 319–322, 1993.

L. Neumeyer, A. Sankar, and V. Digalakis, "A Comparative Study of Speaker Adaptation Techniques," in *Proceedings of EUROSPEECH*, pp. 1127–1130, 1995.

J. Gauvain and C.H. Lee, "Bayesian Learning for Hidden Markov Models with Gaussian Mixture State Observation Densities," *Speech Communication*, vol. 11, 1992.

F. Weng, A. Stolcke, and A. Sankar, "New developments in lattice–Based Search strategies in SRI's H4 system," in *Proceedings of DARPA Speech Recognition Workshop*, (Lansdowne, VA), Feb. 1998.

R. Stern, "Specification of the 1996 Hub4 Broadcast News Evaluation," in *Proceedings of the DARPA Speech Recognition Workshop*, (Chantilly, VA), 1997.

P.C. Woodland et al., "The (H)(T)(K) (L)arge (V)ocabulary (R)ecognition (S)ystem for the 1995 (A)(R)(P)(A) (H)3 (T)ask," *Proceedings of the 1996 DARPA Speech Recognition Workshop* (Harriman, NY), 1996.

J.L. Gauvain et al., "Transcribing Broadcast News: The LIMSI Nov. 96 Hub4 System," *Proceedings of the DARPA Speech Recognition Workshop*, (Chantilly, VA) 1997.

F. Kubala et al., "The 1997 BBN Byblos System Applied to Broadcast News Transcription," *Proceedings of the Broadcast News Transcription and Understanding Workshop*, (Lansdowne, VA) 1998.

Ananth Sankar, "A New Look At HMM Parameter Tying For Large Vocabulary Speech Recognition" Speech Technology and Research Laboratory, SRI International, Menlo Park, CA 94025.

* cited by examiner

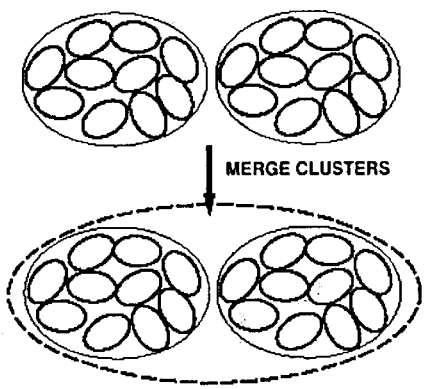
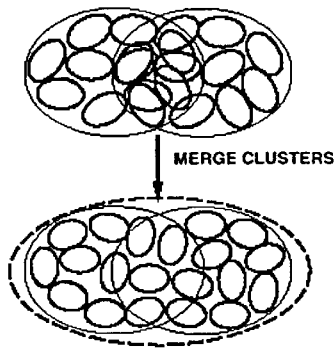
Figure 1: Merging of nonoverlapping state clusters
Figure 2: Merging of overlapping state clusters
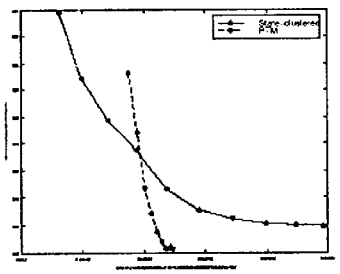
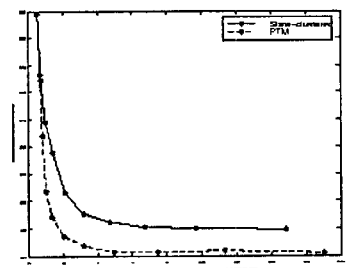
Figure 3: Word error vs. number of Gaussians started
Figure 5: Word error vs. recognition speed
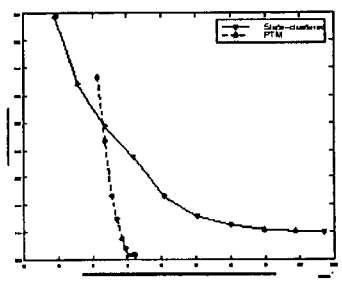
Figure 4: Word error vs. number of Gaussian distance components computed

METHOD AND APPARATUS FOR PROBABILISTIC RECOGNITION USING SMALL NUMBER OF STATE CLUSTERS

This application is a continuation of U.S. application Ser. No. 09/379,411, filed on Aug. 24, 1999 now abandoned. This application claims priority from provisional patent application No. 60/097,789, filed Aug. 25, 1998, which is incorporated herein by reference.

This invention was supported in part by a grant from DARPA through Naval Command And Control Ocean Surveillance Center Under Contract N66001-94-c-6048 and in part by SRI International of Menlo Park, Calif. The Government may have certain rights in this material.

FIELD OF THE INVENTION

The present invention is in the field of methods and devices for probabilistic recognition of physical phenomena. More specifically, the present invention is directed to an improved method for speech recognition using a large set of simple probability functions to model speech units grouped into a limited number of clusters.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This application is filed with a paper appendices of 21 pages which are incorporated as part of this application.

This invention relates to speech recognition by logic devices or processes, and more particularly to recognizing speech from a large vocabulary using partially-tied probability function mixtures for model state recognition with a reduced number of clusters and an increased number of probability functions used in each cluster.

This art presumes a basic familiarity with statistics and probability recognition processes, as well as familiarity with the extensive state of the art in recognition systems.

U.S. Pat. No. 5,825,978, METHOD AND APPARATUS FOR SPEECH RECOGNITION USING OPTIMIZED PARTIAL MIXTURE TYING OF HMM STATE FUNCTIONS provides substantial background information related to the current patent and that patent, and each of its cited references, is incorporated herein by reference. The present invention, however, has applications to other probability recognition paradigms and should not be seen as limited by the above referenced patent.

Current, state-of-the-art Large-Vocabulary Continuous Speech Recognition (LVCSR) systems are typically based on state-clustered hidden Markov models (HMMs). Typically, these systems use thousands of state clusters, each represented by a Gaussian mixture model with a few tens of Gaussians. These systems use HMMs to model triphone speech units. The number of triphones is usually very large. For example, models with 10,000 triphones are common. Because each triphone is usually modeled by at least three HMM states, this results in about 30,000 HMM states. Each state is typically modeled by a Gaussian mixture model (GMM) with a few Gaussians. Thus, the total number of Gaussian parameters can be on the order of hundreds of thousands. Estimating a separate GMM for each triphone state would require a huge amount of training data. However, because training data is usually limited, it is not possible to reliably estimate such a large number of parameters.

In one of the first approaches to robust HMM estimation, called the Tied Mixture (TM) HMM, a single set of Gaussian distributions was shared (or tied) across all the states. [1,2] Because the Gaussians were shared, data could be pooled from different HMM states to train the states robustly. Each state was differentiated by a different mixture weight distribution to these shared Gaussians. The shared Gaussians along with the mixture weights defined the state-dependent GMMs. Because of robust parameter estimation, TM HMMs were found to perform significantly better than "fully continuous" HMMs, where each state used a separate GMM.

To get more detailed models than TM systems, phonetically tied mixture (PTM) systems were proposed. In these systems, a separate Gaussian codebook was shared among all triphone states corresponding to the same base phone. [3]

A further development in the art was state-clustered HMMs [4,5,6], where the amount of tying was decreased further. This represents the state of the art in speech recognition technology up to the time of the present invention. In this approach, the amount of tying is considerably less than in a TM or PTM system. HMM states are clustered according to acoustic similarity. The states in each cluster either share the same GMM [4,5], or only share the same set of Gaussians but use different mixture weights for each state. [6, 7] A small number of Gaussians is used for each cluster, and improved acoustic resolution is achieved by increasing the number of state clusters.

In previous work, state-clustered HMMs were experimentally shown to be superior to TM and PTM HMMs (e.g., see [6]). However, in these previous comparisons, the TM and PTM systems had a total of 256 and 4000 Gaussians, respectively—drastically fewer than the total number of Gaussians present in state-clustered system, which had about 24,000 Gaussians. [6] Other previous work with TM and PTM systems [2,8,9] also appears to have used very few Gaussians in comparison to that generally used in state-clustered systems.

Systems with small numbers of state clusters have previously been studied, but they were not properly explored in that few Gaussians (about 200 to 500) were used in the clusters. This led most practitioners in the art to turn to systems with large numbers of clusters each having few Gaussians.

What is needed is a speech recognition system or method that has the advantages of conceptually simpler mixture tying systems but gives equal or superior performance to state-clustered systems.

A further understanding of the invention can be had from the detailed discussion of specific embodiments below. For purposes of clarity, this discussion refers to devices, methods, and concepts in terms of specific examples. However, the method of the present invention may operate with a wide variety of types of recognition and recognition systems. In particular, while parts of the discussion refer to recognition models as hidden Markov models (HMM), it should be understood that HMM can refer to any type of recognition model unless the context requires otherwise. Likewise, while parts of the discussion refer to Gaussians Mixtures as mixtures used to model probability functions, it should be understood that other continuous and discrete or discrete basic probability functions may be used within the context of the invention.

Furthermore, it is well known in the art that logic systems can include a wide variety of different components and different functions in a modular fashion. Different embodiments of a system can include different mixtures of elements and functions and may group various functions as parts of various elements.

For purposes of clarity, the invention is described in terms of systems that include many different innovative components and innovative combinations of components. No inference should be taken to limit the invention to combinations containing all of the innovative components listed in any illustrative embodiment in this specification.

All publications, patents, and patent applications cited herein are hereby incorporated by reference in their entirety for all purposes.

SUMMARY OF THE INVENTION

In accordance with the invention, speech recognition is provided that takes a new approach to clustering and tying and models used in speech recognition. While it was previously believed that the best performing-systems would be those that used very large numbers of state clusters (about 2000 or more) and few Gaussians per cluster (16 to 32), the current invention uses very few state clusters (about 40 in some embodiments, up to a few hundreds in alternative embodiments) and many Gaussians per state cluster (about 1000). In the present invention, models with far more parameter tying and therefore fewer clusters, like phonetically tied mixture (PTM) models, can give better performance in terms of both recognition accuracy and speed. The present invention can use a conceptually simpler PTM system to achieve faster and more accurate performance than current state-of-the-art state-clustered HMM systems.

Experimental results have shown between a 5 and 10% improvement in word error rate, while cutting the number of Gaussian distance computations in half, for three different Wall Street Journal (WSJ) test sets, by using a PTM system with 38 phoneclass state clusters, as compared to a state-clustered system with 937 state clusters. For both systems, the total number of Gaussians was fixed at about 30,000.

The invention will be better understood upon reference to the following detailed description, taken in conjunction with the accompanying drawings.

BRIEF DESCRIPTION OF THE DRAWINGS

FIG. 1 is a chart illustrating theoretical state clustering.

FIG. 2 is a chart illustrating real-world overlap of state clustering.

FIGS. 3–5 show experimental results for a recognizer according to various embodiments of the invention.

DESCRIPTION OF SPECIFIC EMBODIMENTS

Figure 6:
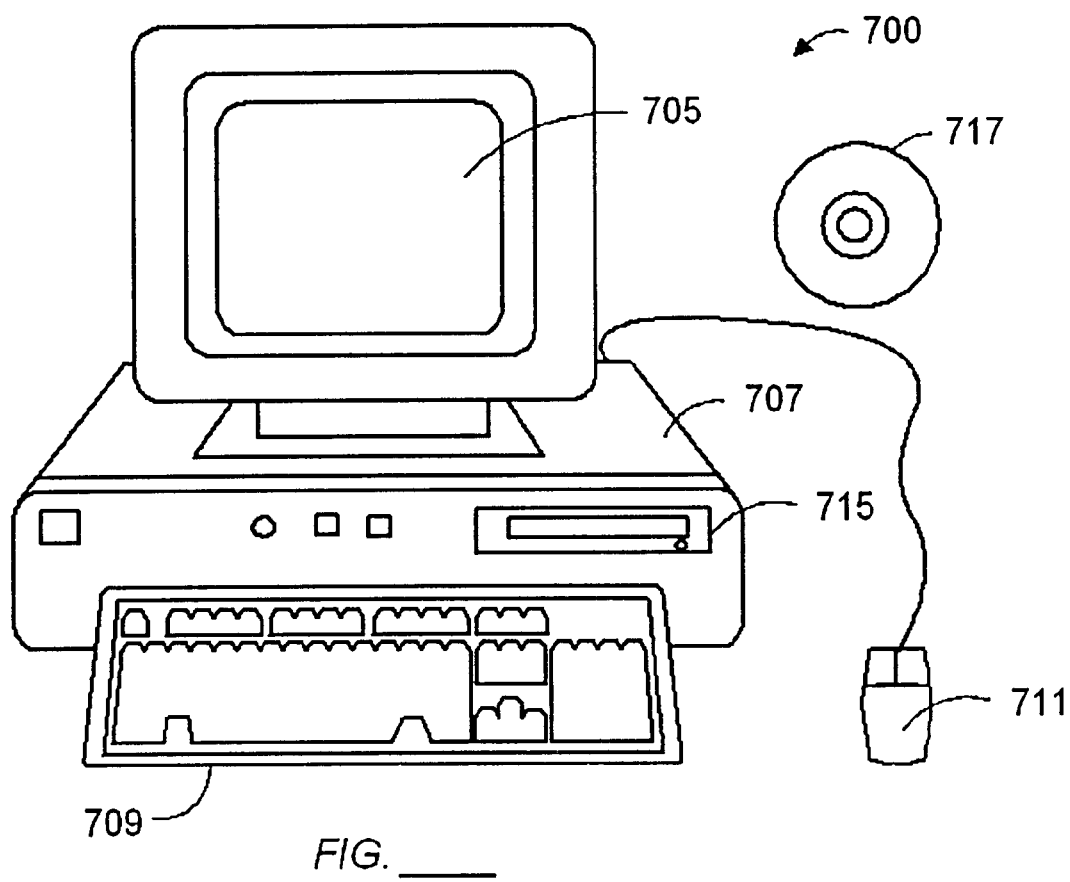
FIG. 6 illustrates an example logic system which may incorporate the invention according to specific embodiments.

An understanding of the present invention will be facilitated by a review of the task and art of automatic speech recognition by computers, presented in U.S. Pat. No. 5,825,978, METHOD AND APPARATUS FOR SPEECH RECOGNITION USING OPTIMIZED PARTIAL MIXTURE TYING OF HMM STATE FUNCTIONS, especially FIGS. 1–3 and their related description, incorporated herein by reference.

According to the present invention, a speech recognizer uses a method for developing and storing model state probability functions that uses fewer clusters with a larger number of Gaussians per cluster than have been generally employed in previous partially-tied systems. Consider a state-clustered system where each state cluster shares the same set of Gaussians, and each triphone state has a separate mixture weight distribution to these shared Gaussians. Suppose one can robustly train at most N state clusters with M Gaussians per cluster, given a certain amount of training data. According to the current invention, by decreasing the number of clusters, while increasing the number of Gaussians per clusters, a system is able to improve the robustness of the Gaussian parameter estimates.

The advantages of the present invention can be better understood by considering the following. Theoretically, if the Gaussian distributions for the N state clusters do not overlap in acoustic space, then further grouping of the clusters, according to the current invention, will have no effect on performance, as the resulting models will be effectively the same, as shown in FIG. 1.

However, in reality, state clusters do overlap in acoustic space, as shown in FIG. 2. In the overlap region, Gaussians are separately estimated for each state cluster. This causes two potential problems in prior art systems:

1. Because the data in the overlap region is divided between the two state clusters, the Gaussians in this region may not be robustly estimated.
2. There may be redundancy between the Gaussians from the two state clusters in the overlap region, resulting in wasted parameters.

In a specific embodiment, the current invention can address these problems by merging the two clusters into one cluster with a increased number (2M) of Gaussians. Because data from the two clusters is now used to estimate a single set of Gaussians, this method provides more robust estimation in the overlap region. Furthermore, the previously redundant Gaussians can now be more effectively used to increase acoustic resolution, as shown in FIG. 2. According to the current invention, the improved Gaussian estimates and the better acoustic resolution can lead to improved recognition accuracy.

While merging the two clusters has these advantages, it also has a potential drawback: it may be necessary to separately estimate Gaussians in the overlap regions to be able to aid in discriminating between the clusters, and merging the clusters can reduce the ability to discriminate between clusters. Because decreasing the number of clusters can have both a positive and a negative effect on accuracy, the optimal number of state clusters can, according to the invention, be determined experimentally so as to minimize the word error on development test data.

State Clustering and Speed

Computation of the frame-log-likelihoods for all the Gaussian components in each active triphone state during the Viterbi search is a significant cost affecting recognition speed. In SRI's DECIPHER™ speech recognition system, this cost is reduced using techniques of Gaussian caching, Gaussian pruning, and Gaussian shortlists. According to the invention, these methods are affected by changing the number of state clusters, as described below.

Gaussian Caching

In Gaussian caching, the log-likelihoods for the Gaussians in a mixture are cached as soon as they are computed for each frame. If the same Gaussian mixture needs to be evaluated at that frame for another triphone state, the cache is used, rather than recomputing the likelihoods of the Gaussians in this mixture. This results in a significant cost saving because many triphone states share the same Gaussian mixture.

When state clusters are merged, the number of mixtures is reduced, but the number of Gaussians per mixture is increased. Thus, while fewer Gaussian mixtures will be computed and cached, the number of Gaussians in each will be proportionally larger. Therefore, the invention should produce no significant effect due to reducing the number of state clusters on the number of Gaussians computed and cached. However, as discussed in the next section, reducing the number of state clusters can decrease the cost of each Gaussian computation.

Gaussian Pruning

When computing the set of Gaussians for a state and frame, it is possible to reduce the amount of Gaussian computations by retaining only those Gaussians whose log-likelihoods are within a threshold of the best Gaussian computed so far. By expanding the diagonal covariance Gaussian likelihood computation, it is easy to see that a system can decide if a Gaussian is within this threshold before computing all the distance components for this frame of speech. This results in a significant reduction in computation cost. Intuitively, the larger the overlap between Gaussians, the larger the number of Gaussians that must be retained for any frame, and the larger the number of distance components that must be computed.

According to the current invention, when state clusters are merged to create a model with less tying, the redundant Gaussians in the state cluster overlap region are more effectively used to cover the acoustic space of the clusters. The resulting Gaussians will also have smaller variances, as shown in FIG. 2. Because smaller variances imply less Gaussian overlap, according to the invention, the number of Gaussian distance components computed will be reduced.

Gaussian Shortlists

Gaussian shortlists are another way to reduce the Gaussian computation during recognition [7]. In this approach, the acoustic space is vector quantized. For each vector quantization (VQ) region, a shortlist of Gaussians that have training data likelihood above some threshold is maintained for each state cluster. During recognition, a system finds the VQ region corresponding to the frame being evaluated, and only computes the likelihoods for the Gaussians in the corresponding shortlists of the state clusters for that VQ region, resulting in a significant speedup.

When state clusters are merged to create systems with fewer clusters and more tying, according to the current invention, the Gaussian variances are reduced, as in FIG. 2. The reduced variance results in less coverage of the acoustic space by each Gaussian. Thus, Gaussians that previously belonged in a shortlist for a VQ region may no longer have likelihoods high enough to belong in the shortlist for that region. Thus, as a result of the current invention, a reduction in the size of the shortlists is achieved by decreasing die number of state clusters, and a corresponding reduction in Gaussian computation.

Number of Codebooks

In one embodiment of the present invention, the number of codebooks is preset to a number such as the number of phones. This provides the benefits of reduced computation as described above and also reduces the processing required for determining clusters.

According to the present invention, PTM systems, if properly trained, can significantly outperform the currently dominant state-clustered HMM-based approach. In particular, experimental results achieved between 5 and 10% reduction in the word error rate. The number of Gaussians in the shortlists was reduced by half. Finally, at a fixed word error rate, a system according to the invention achieved a factor of 2 reduction in Gaussian distance computation during recognition, and a factor of 5 speedup. The current invention thereby can provide a significant performance gain in accuracy, computation, and speed by using PTM systems as opposed to state-clustered systems.

In an alternative embodiment, a modified state-clustered system can be used, with a greater number of codebooks, In this embodiment, additional codebooks may be generated using an automatic procedure as described in the '978 patent incorporated herein by reference to identify clusters for sharing mixture components. Again, however, in the present invention the number of codebooks is kept limited while the number of Gaussians per codebook may be expanded so that a total number of Gaussians used in the system remains comparable to that for systems with large numbers of clusters.

The invention may be used with a training algorithm as described in A. Sankar, "Experiments with a Gaussian Merging-Splitting Algorithm for HMM training for Speech Recognition," in *Proceedings of DARPA Speech Recognition Workshop*, (Lansdowne, Va.), February 1998. In such a case, the algorithm as described may produce a variable number of Gaussians per cluster.

EXPERIMENTAL RESULTS

We experimented using the Wall Street Journal (WSJ) database. For training, we used 18,000 SI284 male training sentences, and for testing we used three different WSJ based test sets. Each test set had 10 speakers, and consisted of about 3600 words, for a total of about 10,900 words. The WSJ domain has been used in previous U.S. Government sponsored speech recognition evaluations. The test sets we used were created for internal development, and are not standardized test sets from the WSJ domain. A 20,000 word bigram language model (LM) was used for recognition. We refer to the three test sets as WSJ1, WSJ2, and WSJ3. We compared two different systems with different levels of tying.

The first is a state-clustered system with 937 clusters and 32 Gaussians per cluster. We chose this baseline configuration because it has given us good performance in the past. The second is a 38 class PTM system with 789 Gaussians per class. Notice that both systems have a total of about 30,000 Gaussians. Both these systems were trained using the Gaussian Merging Splitting (GMS) algorithm that we recently developed [10]. This method computes only as many Gaussians as can be robustly estimated given the amount of training data, thus giving reliable models. Table 1 compares the word error rates for the two systems on the three different test sets. It is clear that the PTM system is significantly more accurate than the state-clustered system on all three test sets. In particular, the word error rate is reduced by 5 to 10%.

In Table 1, we did not use Gaussian shortlists. For the remaining experiments, we used Gaussian shortlists and only used the WSJ 1 test set. In Table 2, we compare the size of the Gaussian shortlists for the state-clustered and the PTM systems. Here "size" refers to the number of Gaussians in the shortlists. The number of Gaussians in the PTM system shortlists is half that in the state-clustered shortlists.

TABLE 1

Word error rates for different levels of tying

| | Word Error Rate (%) | | |
|---|---|---|---|
| System | WSJ1 | WSJ2 | NABN |
| State-clustered | 21.65 | 14.08 | 18.29 |
| PTM | 20.49 | 12.58 | 16.78 |

TABLE 2

Shortlist size for different levels of tying

| System | Shortlist Size |
|---|---|
| State-clustered | 5830534 |
| PTM | 2773199 |

Next, we conducted experiments to evaluate the effect of clustering on recognition computation and speed. We did this by varying the level of pruning in the Viterbi beam search and plotting the word error rate for the WSJ1 test set against different parameters of interest.

These are the number of Gaussians we start computing per frame, the number of actual distance components computed, and the recognition speed of our system. While the first two parameters are an objective measure of the Gaussian computation cost incurred during recognition, the system speed is implementation-dependent. FIGS. 3, 4, and 5 show these plots. It is clear from these figures that a significant computation saving is gained by using the PTM system over the state-clustered system.

At a word error rate of 22%, the PTM system has about a factor of 2 less Gaussians started, a factor of 2 less distance component computations, and a factor of 5 speedup. Further, at almost all speeds, the PTM system has a lower word error rate, as shown in FIG. 5. In all three figures we notice that at very high error rates, the PTM system is worse in terms of Gaussian computation and speed (where the curves cross). This occurs because at these error rates, there are only a few active hypotheses in the search per frame, requiring the computation of only a few mixtures. The fact that the state-clustered system has only 32 Gaussians per state cluster as compared to 789 Gaussians for the PTM system then outweighs the computational benefits of the PTM model described in Section 2.2. However, we do not anticipate operating in this high word error region of the curve.

Variable Clustering

As described above, the invention uses a much larger number of Gaussians per state cluster than in previous state-clustered systems. However, some phone classes may have very little acoustic variability and thus may need only a few Gaussians for good modeling. For example, the nasal /ng/ is less variable than the unvoiced stop /t/.

In an alternative embodiment, the invention exploits this fact by developing a per-phone or per-cluster clustering algorithm that determines the number of simple probability functions per phone based on the acoustic variability.

In one embodiment, to measure a phone or cluster's variability, the invention agglomeratively clusters the HMM states for each phone, using a weighted-by-counts entropy distance between the mixture weight distributions of each state, as is known in the art. Clustering is stopped when the average distance reaches a pre-specified relative threshold. The number of resulting state clusters is a measure of a phone's acoustic variability. In one tested implementation, the number of Gaussians for a phone was proportional to the acoustic variability, with a pre-set minimum and maximum number of Gaussians.

Table 3 shows the word error rate on the 1996 H4 PE development test set and the number of Gaussians for three different female models trained on the first 100 hours of H4 training data. These recognition runs used a 48,000-word bigram LM.

1997-eval is a state-clustered model used for the 1997 DARPA H4 evaluations. PTM-1788 is a PTM model with 1788 Gaussians per phone class, and Clustered-PTM is a model created by applying the per-phone Gaussian clustering algorithm to PTM-1788. From the table, it can be seen that the PTM and state-clustered systems gave the same word error rate. A factor of 5 reduction in the number of Gaussians was achieved using the per-phone Gaussian clustered PTM model, with no difference in the word error rate. The drastic reduction in Gaussians also decreases the amount of computation during recognition.

TABLE 3

Word error rates and number of Gaussians for different Models

| Model | Word (%) Error | Number of Gaussians |
|---|---|---|
| 1997-eval | 39.4 | 67,200 |
| PTM-1788 | 39.7 | 69,732 |
| Clustered-PTM | 39.3 | 12,758 |

Embodiment in a Programmed Digital Apparatus

The invention may be embodied in a fixed media or transmissible program component containing logic instructions and/or data that when loaded into an appropriately configured computing device cause that device to perform recognition according to the invention.

FIG. 6 shows digital device 700 that may be understood as a logical apparatus that can read instructions from media 717 and/or network port 719. Apparatus 700 can thereafter use those instructions to perform recognition tasks. One type of logical apparatus that may embody the invention is a computer system as illustrated in 700, containing CPU 707, optional input devices 709 and 711, disk drives 715 and optional monitor 705. Fixed media 717 may be used to program such a system and could represent a disk-type optical or magnetic media or a memory. Communication port 719 may also be used to program such a system and could represent any type of communication connection.

The invention also may be embodied within the circuitry of an application specific integrated circuit (ASIC) or a programmable logic device (PLD). In such a case, the invention may be embodied in a computer understandable descriptor language which may be used to create an ASIC or PLD that operates as herein described.

The invention also may be embodied within the circuitry or logic processes of other digital apparatus, such as telephones, commications cameras, displays, image editing equipment, etc.

The invention is explained herein with regard to specific and alternative embodiments. Variations on these embodiments and other embodiments will be apparent to those of skill in the art. The invention therefore should not be limited except as provided in the attached claims.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

REFERENCES

1. X. Huang and M. Jack, "Semi-Continuous Hidden Markov Models for Speech Signals," Computer Speech and Language, vol. 3, pp. 239–252, 1989.

2. J. Bellagarda and D. Nahamoo, "Tied Mixture Continuous Parameter Modeling for Speech Recognition," IEEE Transactions on Acoustics, Speech, and Signal Processing, vol. 38, pp. 2033–2045, December 1990.

3. D. Paul, "The Lincoln Robust Continuous Speech Recognizer," in Proceedings IEEE International Conference on Acoustics, Speech, and Signal Processing, pp. 449–452, May 1989.

4. M. Y. Hwang, X. Huang, and F. Alleva, "Predicting Unseen Triphones with Senones," in Proceedings IEEE International Conference on Acoustics, Speech, and Signal Processing, pp. II-311-II-314, 1993.

5. P. Woodland, J. Odell, V. Valtchev, and S. Young, "Large Vocabulary Continuous Speech Recognition Using HTK," in Proceedings IEEE International Conference on Acoustics, Speech, and Signal Processing, pp. II-125-II-128, 1994.

6. V. Digalakis and H. Murveit, "High Accuracy Large Vocabulary Speech Recognition Using Mixture Tying and Consistency Modeling," in Proceedings of the DARPA Human Language Technology Workshop, (Plainsboro, N.J.), 1994.

7. V. Digalakis, P. Monaco, and H. Murveit, "Genones: Generalized Mixture Tying in Continuous Hidden Markov Model Based Speech Recognizers," IEEE Transactions on Speech and Audio Processing, vol. 4, no. 4, pp. 281–289, 1996.

8. O. Kimball and M. Ostendorf, "On the Use of Tied-Mixture Distributions," in Proceedings of the DARPA Human Language Technology Workshop, (Plainsboro, N.J.), 1993.

9. D. B. Paul, "The Lincoln Large Vocabulary Stack-Decoder Based HMM CSR," in Proceedings of the DARPA Human Language Technology Workshop, pp. 399–404, 1994.

10. A. Sankar, "Experiments with a Gaussian Merging-Splitting Algorithm for HMM training for Speech Recognition," in Proceedings of DARPA Speech Recognition Workshop, (Lansdowne, Va.), February 1998.

11. A. Sankar, R. Gadde and F. Weng, "SRI's 1998 Broadcast News System—Toward Faster, Better, Smaller Speech Recognition" in Proceedings of the DARPA Broadcast News Workshop, (Washington, D.C.), February 1999.

12. A. Sankar, R. Gadde. "Parameter Tying and Gaussian Cluster for Faster, Better, and Smaller Speech Recognition, in Proceedings of EUROSPEECH (Budapest, Hungary), September 1999.

MPSH SRJI.001US0

Appendix A

ROBUST HMM ESTIMATION WITH GAUSSIAN MERGING-SPLITTING AND TIED-TRANSFORM HMMS

Related techniques to this discussion are two different approaches for robust estimation of the parameters of context-dependent hidden Markov models (HMMs) for speech recognition. The first approach, the Gaussian Merging-Splitting (GMS) algorithm, uses Gaussian splitting to uniformly distribute the Gaussians in acoustic space, and merging so as to compute only those Gaussians that have enough data for robust estimation.

This method is more robust than previous training techniques. The second approach, called tied-transform HMMs, uses maximum-likelihood transformation based acoustic adaptation algorithms to transform a small HMM to a much larger HMM. Because the transforms are shared or tied among Gaussians in the larger HMM, robust estimation is achieved. This approach gives a significant improvement in recognition accuracy and a dramatic reduction in memory needed to store the models.

1. INTRODUCTION

Most conventional automatic speech recognition (ASR) systems are based on context dependent (CD) phone based hidden Markov models (HMMs) that use Gaussian mixture models (GMMs) for the state conditioned observation densities. A commonly used CD unit is the triphone, which is a model of a phone in the context of a left and right phone. The number of triphones in typical HMMs is very large, and the training data limited, resulting in poor estimates of the model parameters. A popular solution to this problem is to use HMM state clustering where the states in a cluster share a set of parameters, such as a set of Gaussians [1, 2]. Pooling data among shared parameters in this way gives robust estimates.

In this paper, we report on two techniques we have recently developed for robust CDHMM estimation. The first is a training algorithm called Gaussian Merging-Splitting (GMS), which we have also described in [3]. The GMS algorithm is a robust method to train the GMMs in state-clustered HMMs. In this approach, Gaussian splitting is used to uniformly distribute the Gaussians in the acoustic space. In addition, we use a Gaussian merging algorithm to automatically select the number of Gaussians in the GMMs for each state cluster subject to a constraint on the maximum possible number of Gaussians. This algorithm merges Gaussians that have too little data, effectively reducing the number of Gaussians in that state cluster, and leading to more robust estimation. This algorithm results in a variable number of Gaussians in each state cluster, where the number of Gaussians in each cluster is dependent on the amount of data segmented into the states in that cluster. We compare the GMS algorithm to our previous training algorithm, and show that it gives more robust model estimates.

While the GMS algorithm works well, it indirectly addresses the problem of robust estimation by estimating only those Gaussians for which there is enough data. We present a second approach called tied-transform HMMs (or $T^2$-HMMs) that directly addresses the problem of estimating Gaussian parameters with little data. In this approach, an HMM is first trained robustly using the GMS algorithm.

This is then adapted to an HMM with a larger number of state clusters using maximum-likelihood (ML) transformation based acoustic adaptation [4, 5, 6, 7]. The Gaussians in each state cluster in the larger HMM share the same transform, or set of transforms.

Because of this sharing, or tying, we can robustly estimate the transforms, resulting in reliable estimates of the Gaussians in the larger HMM. We show that this approach gives a significant improvement in accuracy over the GMS algorithm. In addition, because the large HMM can be stored as a combination of the smaller HMM and the set of tied transforms, instead of having to store all the Gaussian parameters of the large HMM individually, we get a dramatic reduction in the number of model parameters that need to be stored.

In Section 2 we describe the GMS algorithm, and in Section 3 we describe the $T^2$-HMM approach. Experimental results for these methods are described in their respective sections. We summarize in Section 4.

2. GAUSSIAN MERGING-SPLITTING ALGORITHM

2.1. Previous Training Algorithm

SRI's DECIPHER TM speech recognition system is based on HMM state clustering where the states in each cluster share the same set of Gaussians or Genone [1]. Each state in a cluster has a different mixture weight distribution to these shared Gaussians. The HMM states are clustered separately for each phone.

Consider the problem of training an HMM with 32 Gaussians per Genone. This is done by first training a phonetically tied mixture (PTM) system, where all states in a phone share the same set of 100 Gaussians. The states in this phone are then clustered using bottom-up agglomerative clustering. For clustering, the distance between two states is given by the weighted-by-counts increase in entropy of the mixture weight distribution (to the shared 100 Gaussians) due to merging the two states [1].

MPSH SRII.001US0

The Gaussians in each state cluster are initialized using the corresponding 100 PTM Gaussians. The 100 Gaussians in each phone are clustered down to the required number for each state cluster through a series of steps involving the selection of the most likely Gaussians for each state cluster, and also Gaussian merging. Details of the algorithm can be found in [1].

This approach poses the following potential problem for the initial values of the Gaussians in the state clusters and hence the final models: The 100 PTM Gaussians cover the entire acoustic space for a particular phone; however, each state cluster for this phone covers only a small part of this large acoustic space. Thus, the PTM Gaussians may not be appropriate for initializing the Gaussians in the individual state clusters, and may result in inefficient use of the parameters. Because the expectation-maximization (EM) algorithm, which is commonly used to estimate HMMs, is locally optimal, good initial values are important.

To address this issue, we developed an algorithm that uses Gaussian splitting to uniformly distribute the Gaussians in the acoustic space for each state cluster. We then combined this with Gaussian merging so as to make sure that each Gaussian had at least a threshold of data. The combination of these methods thus gives good acoustic coverage for the Gaussians and also robust parameter estimates. We now briefly describe these methods.

2.2. Gaussian Splitting

We implemented an initialization scheme based on the splitting strategy commonly used in vector quantization [8]. In this approach, we first estimate a single Gaussian model for each Genone. Given the segmentation of data into HMM states, the ML estimate of these (single) Gaussians is globally optimal. We then split the Gaussian for each Genone into two by slightly perturbing the mean of the Gaussian along the direction of the standard-deviation vector, and reestimate the model by further EM training. This process of splitting and retraining is repeated until the required number of Gaussians is achieved. At each stage, we can choose how many Gaussians to split. Thus, if there are currently $n$ Gaussians which we want to increase to $m$ Gaussians, then we split the $m-n$ Gaussians which have the largest average sample variance. This average, computed by using the geometric mean, is a measure of the likelihood of the training data modeled by that single Gaussian model. The Gaussian with the largest variance is the one for which the training data likelihood is minimum. Because our goal is to maximize the training data likelihood, splitting this Gaussian is intuitively appealing. A similar Gaussian splitting algorithm is used in the Cambridge University HTK system, though a different criterion is used to select which Gaussian to split [2].

MPSH SRII.001US0

| Database | Word Error Rate (%) | | | |
|---|---|---|---|---|
| | Old algorithm | | GMS algorithm | |
| | 991 Genones | 2027 Genones | 991 Genones | Genones |
| WSJ1 | 23.7 | 25.3 | 23.5 | 23.9 |
| WSJ2 | 13.7 | 15.5 | 13.5 | 14.1 |
| WSJ3 | 24.3 | 26.0 | 23.9 | 25.1 |

Table 1: Comparison of word error rates (%) for systems with different numbers of parameters.

The Gaussian splitting approach can be configured in a variety of ways. For example, we may split all Gaussians at each stage, or may split only the single largest variance Gaussian, or may do something in between these extremes. We experimented with many of these approaches. While there was not a very significant difference in performance, we decided on a simple strategy that splits all Gaussians at each stage until we have the desired number of Gaussians per Genone.

2.3. Gaussian Merging

If there is too little training data segmented into an HMM state cluster, then the Gaussians in the corresponding Genone will not be well estimated. To ensure robust Gaussian estimation, we used a Gaussian merging algorithm. In this method, the Gaussians in a Genone are iteratively merged using bottom-up agglomerative clustering until all Gaussians have at least a threshold amount of data.

This threshold is specified by the user, and its optimum value is experimentally determined. For clustering, the distance between two Gaussians is given by the weighted-by-counts increase in entropy due to merging the Gaussians. More details of the GMS algorithm can be found in [3].

2.4. Experimental Results

We trained HMMs using a small subset of the Wall Street Journal (WSJ) SI284 male training data. We used 71 of the 142 male training speakers and about 50 sentences from each for a total of about 3500 training sentences. We created three different WSJ test sets, denoted as WSJ1, WSJ2, and WSJ3, each with 10 male speakers and about 3600 words, for a total of about 10,900 words in all. For speed of experimentation, recognition was run from bigram lattices described in [9].

To measure the robustness of the training algorithms, we trained two HMMs, one with about 1000 Genones and the second with about 2000 Genones. Both models had 32 Gaussians per Genone. We trained models using both our old algorithm and the new GMS algorithm.

Table 1 shows that the GMS algorithm performs similarly to the old method for the smaller model, but is significantly superior for the larger model, where the number of parameters is very large relative to the amount of training data. This shows the robustness of the GMS algorithm relative to our previous approach. We have given a more detailed comparison of the GMS algorithm with our previous training approach in [3].

3. TIED-TRANSFORM HMM
3.1. Algorithm Description

While the GMS algorithm gives robust parameter estimates, it does so indirectly by creating only as many Gaussians as there is enough data to estimate robustly. Thus, the total number of Gaussians is limited by the amount of training data. It would be advantageous to be

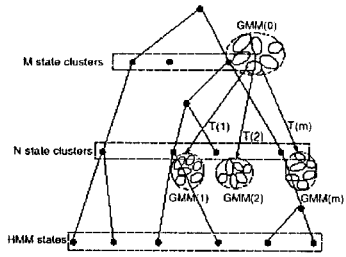

Figure 1: Illustration of $T^2$-HMM able to reliably estimate a larger number of Gaussian parameters with the same amount of limited data. The tied-transform HMM ($T^2$-HMM) algorithm is one approach that achieves this goal.

As explained in Section 2, we use bottom-up agglomerative clustering to cluster HMM states in a state cluster tree. This tree can be cut at different levels to create different numbers of state clusters. For each state cluster set, we can train a state-clustered HMM. The larger the number of clusters, the more difficult it is to robustly estimate the parameters with a limited amount of data. We explain the concept of $T^2$-HMMs using the state cluster tree in Figure 1. Suppose our goal is to train an HMM for the larger number of state clusters $N$. However, we do not have enough data to robustly estimate each Gaussian. In the $T^2$-HMM, we solve this problem by training an HMM for the smaller number of state clusters $M$, for which we assume we have enough data to robustly estimate each Gaussian. We can always select a small enough $M$ so that robust Gaussian estimates are possible. Each state cluster in the larger HMM is a descendent of a state cluster in the smaller HMM as shown in the figure. Thus, we can define a mapping from the smaller to the larger HMM in terms of this ancestor descendent relationship.

MPSH SRII.001US0

The Gaussians in the state clusters of the larger HMM are transformed versions of the ancestor Gaussians in the smaller HMM. In the figure, the transformations T(1),...,T(m) are used to map the Gaussians in GMM (0) to the Gaussians in GMM(1),...,GMM(m).

T(i) can also be a set of transforms, each tied to a cluster of acoustically similar Gaussians in a state cluster. Because the transforms are tied to a set of Gaussians in the Nstatecluster HMM, they can be estimated with the pooled data from all those Gaussians. This results in robust estimates of the transforms. In contrast, it is not possible to separately estimate the Gaussians in the Ncluster HMM because there is not enough training data for each Gaussian. The estimation problem is now that of computing the parameters of the smaller HMM and the parameters of the transformations. We can use different types of transformations as have been described in the acoustic adaptation literature [4, 5, 6, 7, 10]. In this paper, we chose to use the block diagonal affine matrix transform of the Gaussian means as this has given us good performance in the past for speaker adaptation [10]. We solve the ML estimation problem iteratively. First, we assume identity transforms and estimate the parameters of the smaller HMM. Then we keep the parameters of the small HMM fixed, and estimate the transformations. This procedure can be iterated. However, in our experiments, we used only one iteration of this approach. The ML estimation of HMM parameters is well established, and that of the transformations has previously been studied in the context of acoustic adaptation [4, 5, 6, 7].

The $T^2$-HMM idea is related to that of Bayesian estimation of HMM parameters [11]. In Bayesian estimation too, a small HMM is adapted to a large HMM, but using Bayesian smoothing, instead of ML transformation based adaptation as in $T^2$-HMMs. The $T^2$-HMM approach has the advantage that we need to store only the parameters of the small HMM and the tied transformation parameters, while in the Bayesian approach, all the Gaussian parameters of the large HMM must be individually stored. This results in a dramatic reduction in storage for the $T^2$-HMMs.

3.2. Experimental Results

We experimented using the Hub4 broadcast news domain. This is the domain for current U.S. Government sponsored continuous speech recognition evaluations. For training we used the male subset of the 100 hours of Hub4 training data released by NIST for the 1997 DARPA sponsored Hub4 evaluation. For testing, we used the 1996 Hub4 male development test. We ran recognition using trigram lattices generated with our recently developed lattice tools [12]. The Hub4 data is categorized into 7 different acoustic categories. These range from the planned speaking style of news announcers (F0), to noisy speech (F4), to speech that is not classifiable into any acoustic category (FX). A detailed description of this task can be found in [13].

Table 2 gives the recognition word error rates on this test set comparing the GMS algorithm, the T²-HMM approach, and a Bayesian smoothing approach similar to that of [11]. We trained a crossword state-clustered HMM with 2209 state clusters, and one with 8409

|  | GMS | | Bayesian smoothing | T²-HMM |
|---|---|---|---|---|
|  | Number of clusters | | | |
|  | 2209 | 8409 | 8409 | 8409 |
|  | 32 Gaussians per cluster | | | |
|  | Number of Gaussian parameters in Millions | | | |
|  | 5.5 | 30 | 30 | 9.8 |
| F0 | 14.2 | 15.6 | 14.2 | 14.4 |
| F1 | 30.5 | 30.7 | 29.3 | 29.2 |
| F2 | 37.5 | 38.2 | 36.2 | 36.4 |
| F3 | 29.0 | 30.8 | 30.5 | 29.9 |
| F4 | 27.5 | 27.4 | 26.2 | 26.2 |
| F5 | 28.2 | 29.3 | 28.0 | 28.2 |
| FX | 56.4 | 56.2 | 56.0 | 56.0 |
| All | 31.4 | 32.0 | 30.7 | 30.7 |

Table 2: Comparison of word error rates (%) for different training algorithms on the 1996 Hub4 development data clusters. The 2209cluster system is the one we used for the 1997 Hub4 evaluations. Table 2 shows that the 8409cluster model gives worse performance than the 2209cluster model when trained using the GMS algorithm. We then trained the 8409cluster system by adapting the 2209cluster system using both Bayesian smoothing and the T²-HMM approach. Both techniques give an improvement over the GMS algorithm for the 8409cluster system (32.0% to 30.7%). A smaller, but significant, improvement is observed over the 2209cluster system (31.4% to 30.7%).

From Table 2, we see that the Bayesian smoothing algorithm and the T²-HMM algorithm gave the same word error rate. However, the T²-HMM can be stored much more efficiently, because we need to store only the smaller HMM and the set of transforms, as opposed to the Bayesian algorithm, where we must independently store each Gaussian in the larger model. In particular, as shown in Table 2, the T²-HMM needs a factor of 3 less parameters to store the Gaussian distributions as compared to the Bayesian trained HMM.

SUMMARY

We presented two algorithms to robustly train state-clustered HMM systems. The first method, the GMS algorithm, addresses the problem indirectly by computing only those

MPSH SRII.001US0

Gaussians for which there is enough data. The second algorithm, the $T^2$-HMM, does this directly by transforming well estimated Gaussians in a smaller HMM to Gaussians in a larger HMM. The $T^2$-HMM algorithm gives robust estimates where we are unable to estimate the Gaussians directly because of limited training data. Experimental results show that the GMS algorithm is more robust than our previous training procedure for state-clustered HMMs. The $T^2$-HMM gives a significant improvement in accuracy over the GMS algorithm. It also allows us to estimate much larger HMMs than possible with the GMS algorithm, leading to improved accuracy. The $T^2$-HMM gave similar word error rates as compared to a Bayesian training algorithm. However, it required a factor of 3 less parameters to store the Gaussians.

APPENDIX A REFERENCES

1. V. Digalakis, P. Monaco, and H. Murveit, "Genones: Generalized Mixture Tying in Continuous Hidden Markov Model Based Speech Recognizers," *IEEE Transactions on Speech and Audio Processing*, vol. 4, no. 4, pp. 281-289, 1996.

2. S. Young and P. Woodland, "The Use of State Tying in Continuous Speech Recognition," in *Proceedings of EUROSPEECH*, pp. 2203-2206, 1993.

3. A. Sankar, "Experiments with a Gaussian Merging-Splitting Algorithm for HMM training for Speech Recognition," in *Proceedings of DARPA Speech Recognition Workshop*, (Lansdowne, VA), February 1998.

4. A. Sankar and C.H. Lee, "Stochastic Matching for Robust Speech Recognition," *IEEE Signal Processing Letters*, vol. 1, pp. 124-125, August 1994.

5. A. Sankar and C.H. Lee, "A Maximum-Likelihood Approach to Stochastic Matching for Robust Speech Recognition," *IEEE Transactions on Speech and Audio Processing*, vol. 4, pp. 190-202, May 1996.

6. V. Digalakis, D. Rtischev, and L. Neumeyer, "Speaker Adaptation Using Constrained Reestimation of Gaussian Mixtures," *IEEE Transactions on Speech and Audio Processing*, vol. 3, no. 5, pp. 357-366, 1995.

7. C. J. Legetter and P. C. Woodland, "Flexible Speaker Adaptation Using Maximum Likelihood Linear Regression," in *Proceedings of the Spoken Language Systems Technology Workshop*, pp. 110-115, 1995.

8. Y. Linde, A. Buzo, and R. Gray, "An Algorithm for Vector Quantizer Design," *IEEE Transactions on Communications*, vol. COM28, pp. 84-95, January 1980.

9. H. Murveit, J. Butzberger, V. Digalakis, and M. Weintraub, "LargeVocabulary Dictation Using SRI's DECIPHER(TM) Speech Recognition System: ProgressiveSearch

MPSH SRII.001US0

Techniques," in *Proceedings IEEE International Conference on Acoustics, Speech, and Signal Processing*, pp. II 319-322, 1993.

10. L. Neumeyer, A. Sankar, and V. Digalakis, "A Comparative Study of Speaker Adaptation Techniques," in *Proceedings of EUROSPEECH*, pp. 1127-1130, 1995.

11. J. Gauvain and C.H. Lee, "Bayesian Learning for Hidden Markov Models with Gaussian Mixture State Observation Densities," *Speech Communication*, vol. 11, 1992.

12. F. Weng, A. Stolcke, and A. Sankar, "New developments in lattice-based search strategies in SRI's H4 system," in *Proceedings of DARPA Speech Recognition Workshop*, (Lansdowne, VA), February 1998.

13. R. Stern, "Specification of the 1996 Hub4 Broadcast News Evaluation," in *Proceedings of the DARPA Speech Recognition Workshop*, (Chantilly, VA), 1997.

Parameter Tying and Gaussian Clustering for Faster, Better, and Smaller Speech Recognition*

*Ananth Sankar and Venkata Ramana Rao Gadde*

Speech Technology and Research Laboratory
SRI International
333 Ravenswood Avenue
Menlo Park, CA 94025

ABSTRACT

We present a new view of hidden Markov model (HMM) state tying, showing that the accuracy of phonetically tied mixture (PTM) models is similar to, or better than, that of the more typical state-clustered HMM systems. The PTM models require fewer Gaussian distance computations during recognition, and can lead to recognition speedups. We describe a per-phone Gaussian clustering algorithm that automatically determines the number of Gaussians for each phone in the PTM model. Experimental results show that this method gives a substantial decrease in the number of Gaussians and a corresponding speedup with little degradation in accuracy. Finally, we study mixture weight thresholding algorithms to drastically decrease the number of mixture weights in the PTM model without degrading accuracy. More than a factor of 10 reduction in mixture weights is achieved with no degradation in performance.

1. Introduction

In most state-of-the-art hidden Markov model (HMM)-based speech recognition systems, HMM states are clustered into acoustically similar groups, and each group shares a set of Gaussian distributions. Typical systems use thousands of state clusters and in excess of 100,000 Gaussians [1]. In a recent paper, we showed that by drastically increasing the amount of state tying, we can get improved accuracy and also a significant recognition speedup [2]. Specifically, we used a phonetically tied mixture (PTM) system with only 39 state clusters corresponding to individual phone classes, and a large number of Gaussians per phone class. On Wall Street Journal (WSJ) test sets, we observed significant and simultaneous improvements in speed and accuracy over a state-clustered system with a similar total number of Gaussian parameters [2]. In this paper, we extend our previous WSJ study to the H4 Broadcast News database.

To achieve high accuracy with a PTM system, it is necessary to use many more Gaussians per state cluster than is typical in standard state-clustered systems. We assigned Gaussians to state clusters so as to keep the total number constant across the PTM and state-clustered systems being compared [2]. Thus, a state-clustered system with 1000 clusters and 39 Gaussians per cluster would correspond to a PTM system with 39 phone classes and 1000 Gaussians per class. In this paper, we present a per-phone Gaussian clustering algorithm that can dramatically decrease the number of Gaussians for the PTM system without degrading the accuracy. We have presented some results on this algorithm in a recent paper [3]; here, we give more detailed experimental results, showing a drastic decrease in number of Gaussians and increase in recognition speed.

The larger number of Gaussians per state cluster in the PTM system leads to a potential problem. Each state in the PTM system has a mixture weight distribution to a larger number of shared Gaussians than in a state-clustered system. Thus the total number of mixture weights could be much larger in a PTM system. Considering the example above, if there were 9000 HMM states, then the state-clustered system would require $9000 X 39 = 351,000$ mixture weights, whereas the PTM system would require $9000 X 1000 = 9,000,000$ mixture weights. We describe experiments using a mixture weight thresholding algorithm that significantly decreases the number of mixture weights that must be represented without degrading accuracy.

2. Improved Parameter Tying

With speech recognition systems based on state-clustered HMMs, the significant overlap of state clusters in acoustic space leads to potential problems. The data in the cluster overlap regions is divided between clusters, giving less robust Gaussian estimates. Gaussians from each state cluster may also overlap with each other, causing redundancy and a waste of parameters. These modeling problems can be easily handled by decreasing the number of clusters and appropriately increasing the number of Gaussians per cluster [2], so that the total number of Gaussians is more or less constant. We also expect a significant savings in Gaussian computation due to the smaller variances of the Gaussians when state clusters are merged [2].

In Section 5, we present experimental results on the H4 Broadcast News database, using systems with different numbers of state clusters. We show that drastically decreasing the number of state clusters to form a PTM system results in accuracy similar to, or better than, that of a state-clustered system, but reduces the computation for recognition and increases the speed.

---

*This work was sponsored by DARPA through the Naval Command and Control Ocean Surveillance Center under contract N66001-94-C-6048

3. Per-phone Gaussian Clustering

In the PTM approach, we must use a much larger number of Gaussians per state cluster than in previous state-clustered systems. However, some phone classes may have very little acoustic variability and thus may need only a few Gaussians for good modeling. For example, the nasal /ng/ is less variable than the unvoiced stop /t/. Thus we can use fewer Gaussians to model /ng/ and more to model /t/. This approach gives a more optimal distribution of Gaussians than a uniform distribution.

To measure a phone's acoustic variability, we agglomeratively cluster the HMM states for each phone, using a weighted-by-counts entropy distance between the mixture weight distributions of each state [4]. Clustering is stopped when the average distance reaches a prespecified relative threshold. The acoustic variability measure we used is the number of state clusters for each phone after clustering is stopped. The number of Gaussians per phone is linearly proportional to the acoustic variability of that phone, with a prespecified minimum and maximum number of Gaussians. We also preset the acoustic variability at which the minimum and maximum number of Gaussians is realized. If the acoustic variability for a phone $p$ is given by $a_p$, the minimum and maximum number of Gaussians is $min_g$ and $max_g$, and the acoustic variability for the minimum and maximum number of Gaussians is $min_a$ and $max_a$, respectively, then the number of Gaussians for the phone is given by $$n g_p = \begin{cases} min_g & \text{if } a_p < min_a \\ max_g & \text{if } a_p > max_a \\ min_g + \frac{max_g - min_g}{max_a - min_a} * (a_p - min_a) & \text{otherwise.} \end{cases} \quad (1)$$

4. Mixture Weight Reduction

One problem with our PTM modeling approach is that the mixture weight distributions for each state can become very large. This occurs because our PTM system uses a much larger number of Gaussians for each phone than the number of Gaussians used for a state cluster in a typical state-clustered system. Hence each state belonging to a phone is represented by a significantly larger mixture weight distribution than a state in a state-clustered system. Since the total number of mixture weights in a model is the product of the number of mixture weights for a state cluster multiplied by the number of states, this leads to a large storage requirement for the mixture weights. For example, a state-clustered model with 1000 state clusters, each with 32 Gaussians has the same number of Gaussians as a PTM model with 40 phones and 800 Gaussians per phone, but in terms of mixture weights the state-clustered model is 25 times smaller.

We examined two schemes to reduce the number of mixture weights that need to be represented in our PTM models. In a "Zeroing scheme", we set all mixture weights below a threshold to zero and renormalize the mixture weights. In an "Averaging scheme", we set each mixture weight below the threshold to a value equal to the average of all mixture weights below the threshold. The mixture weights above the threshold are unchanged. Both these schemes were proposed in [5].

We conducted experiments to study the performance of these schemes for different thresholds. The results showed that the Zeroing scheme is useful only at very small thresholds, whereas the Averaging scheme was useful at large thresholds. In experiments with a PTM model trained on the WSJ data, the Averaging scheme reduced the number of mixture weights by a factor of 16 with only a small degradation in the word error rate[3].

5. Experimental Results

Our experiments are based on the H4 Broadcast News database, which has been the test-bed for recent DARPA-sponsored speech recognition benchmarks [1]. For training, we used the first 100 hours of H4 training data, and for testing we use the 1996 H4 female development test set. We trained five different acoustic models:

G36 : A Genone-based state-clustered model [4] with 1936 state clusters and 36 Gaussians per cluster. The number of state clusters and Gaussians have been chosen to be fairly typical of currently used state-clustered models.

G128 : A Genone-based state-clustered model with 525 state clusters and 128 Gaussians per cluster. This represents a state-clustered system with increased tying.

P1788 : A PTM model with 39 phone classes and 1788 Gaussians. per class

CLS13K : A per-phone clustered PTM model with a total of about 13,000 Gaussians.

CLS5K : A per-phone clustered PTM model with a total of about 5000 Gaussians.

The first three models have a similar total number of Gaussians, whereas the last two (per-phone Gaussian clustered) models have significantly fewer Gaussians.

Our first set of experiments was to measure the word error rate for each of the acoustic models, using a 48,000-word bigram language model (LM), and trigram LM lattices. The trigram lattices constrain the search space to the most likely paths for each sentence, using a previous search pass [6]. Thus the number of active paths per frame for the bigram LM will be much larger than that for the trigram lattices. The word error rates observed with trigram lattices cannot necessarily be used to compare the different acoustic models, since the lattices represent only a small subset of the full search space. However, since lattice recognition is an important step in the multipass search strategy we use for our DARPA evaluation systems [3], we decided to also compare word error rates using lattices. We used a large enough pruning beamwidth in the Viterbi search so that search errors did not affect the word error.

Table 1 shows that the G128 and P1788 models give lower word error rates than the G36 model with bigram LMs. They also give lower word error rates with trigram lattices, though here the difference is less apparent. G128 and P1788 are similar in accuracy; however both are superior to the baseline G36 state-clustered model. This shows that lower word error rate can be achieved by increasing the amount of tying as compared to that used in standard state clustered systems like G36. In previous experiments on the WSJ database, we observed even larger improvements by using PTM models [2]. CLS13K gives slightly better performance than P1788. The better performance is a bit surprising, but could be ascribed to the fact that we used a few more training iterations for CLS13K. This shows that using per-phone Gaussian clustering to reduce the number of Gaussians by more than a factor of 5 did not degrade the accuracy. However, CLS5K, which has an extremely small number of Gaussian parameters, gives a higher word error rate.

| Model | Word Error Rate(%) bi | tri | Number of Gaussians | Number of mixture weights (millions) |
|---|---|---|---|---|
| G36 | 40.5 | 31.9 | 69,696 | 0.7 |
| G128 | 39.2 | 31.8 | 67,200 | 2.6 |
| P1788 | 39.6 | 31.5 | 69,732 | 36.1 |
| CLS13K | 39.3 | 31.1 | 12,758 | 7.9 |
| CLS5K | 41.0 | 32.5 | 5,325 | 3.2 |

Table 1: Word error rates and number of parameters for different models

Next, we studied the trade-off between word error rate and recognition computation and recognition speed for G36, P1788 and CLS13K. The idea was to study the effect of increasing the tying over the baseline G36 model and then the effect of using the per-phone Gaussian clustering algorithm. We did this by running recognition experiments with different pruning beamwidths. For each beamwidth, we plot the word error rate against the number of Gaussians computed per frame and the recognition time. Figure 1 shows the word error rate against the number of Gaussians computed per frame, and Figure 2 shows the word error rate against recognition time when recognition is run with a bigram LM. Recognition time is given in number of times real time on a 400-MHz Pentium II with 480 MB RAM. Figure 1 shows that P1788 requires

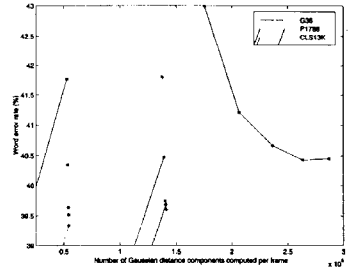

Figure 1: Word error rate vs. number of Gaussian distance components computed

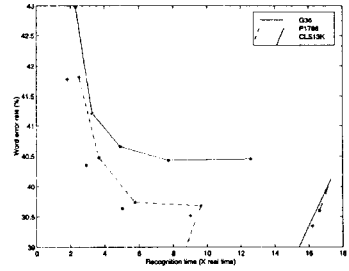

Figure 2: Word error rate vs. Recognition time a factor of 2 fewer Gaussian computations than G36 for a word error rate of 40.5% (this is the lowest word error rate for G36). A further 2.5 factor decrease in Gaussian computation is achieved by using CLS13K. Also P1788 and CLS13K achieve this accuracy at a lower pruning threshold, thus resulting in ▇▇▇▇▇▇ fewer active hypotheses in the search. This and the reduction in Gaussian computation result in a recognition speedup as shown in Figure 2. The ▇▇▇ shows that the recognition time for G36 is about 8 times real time, for P1788 about 4 times real time, and for CLS13K about 3 times real time at a word error rate of about 40.5%. This means that a factor of 2 speedup was achieved using P1788 and a further 25% increase in speed is achieved by using CLS13K.

In the ▇▇▇ set of experiments, we studied the effect of mixture weight reduction on the different models. This is especially important for the PTM models where the number of mixture weights is very large. Even with per-phone Gaussian clusbe much larger than that for the trigram lattices. The word error rates observed with trigram lattices cannot necessarily be used to compare the different acoustic models, since the lattices represent only a small subset of the full search space. However, since lattice recognition is an important step in the multipass search strategy we use for our DARPA evaluation systems [3], we decided to also compare word error rates using lattices. We used a large enough pruning beamwidth in the Viterbi search so that search errors did not affect the word error.

Table 1 shows that the G128 and P1788 models give lower word error rates than the G36 model with bigram LMs. They also give lower word error rates with trigram lattices, though here the difference is less apparent. G128 and P1788 are similar in accuracy; however both are superior to the baseline G36 state-clustered model. This shows that lower word error rate can be achieved by increasing the amount of tying as compared to that used in standard state clustered systems like G36. In previous experiments on the WSJ database, we observed even larger improvements by using PTM models [2]. CLS13K gives slightly better performance than P1788. The better performance is a bit surprising, but could be ascribed to the fact that we used a few more training iterations for CLS13K. This shows that using per-phone Gaussian clustering to reduce the number of Gaussians by more than a factor of 5 did not degrade the accuracy. However, CLS5K, which has an extremely small number of Gaussian parameters, gives a higher word error rate.

| Model | Word Error Rate(%) | | Number of Gaussians | Number of mixture weights (millions) |
|---|---|---|---|---|
| | bi | tri | | |
| G36 | 40.5 | 31.9 | 69,696 | 0.7 |
| G128 | 39.2 | 31.8 | 67,200 | 2.6 |
| P1788 | 39.6 | 31.5 | 69,732 | 36.1 |
| CLS13K | 39.3 | 31.1 | 12,758 | 7.9 |
| CLS5K | 41.0 | 32.5 | 5,325 | 3.2 |

Table 1: Word error rates and number of parameters for different models

Next, we studied the trade-off between word error rate and recognition computation and recognition speed for G36, P1788 and CLS13K. The idea was to study the effect of increasing the tying over the baseline G36 model and then the effect of using the per-phone Gaussian clustering algorithm. We did this by running recognition experiments with different pruning beamwidths. For each beamwidth, we plot the word error rate against the number of Gaussians computed per frame and the recognition time. Figure 1 shows the word error rate against the number of Gaussians computed per frame, and Figure 2 shows the word error rate against recognition time when recognition is run with a bigram LM. Recognition time is given in number of times real time on a 400-MHz Pentium II with 480 MB RAM. Figure 1 shows that P1788 requires

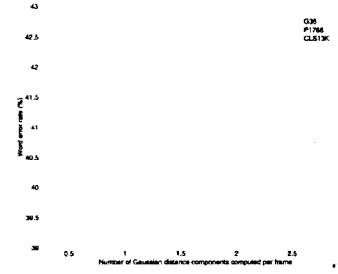

Figure 1: Word error rate vs. number of Gaussian distance components computed

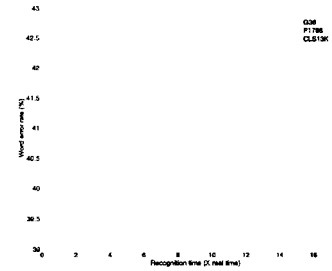

Figure 2: Word error rate vs. Recognition time a factor of 2 fewer Gaussian computations than G36 for a word error rate of 40.5% (this is the lowest word error rate for G36). A further 2.5 factor decrease in Gaussian computation is achieved by using CLS13K. Also P1788 and CLS13K achieve this accuracy at a lower pruning threshold, thus resulting in significantly fewer active hypotheses in the search. This and the reduction in Gaussian computation result in a recognition speedup as shown in Figure 2. The figure shows that the recognition time for G36 is about 8 times real time, for P1788 about 4 times real time, and for CLS13K about 3 times real time at a word error rate of about 40.5%. This means that a factor of 2 speedup was achieved using P1788 and a further 25% increase in speed is achieved by using CLS13K.

In the final set of experiments, we studied the effect of mixture weight reduction on the different models. This is especially important for the PTM models where the number of mixture weights is very large. Even with per-phone Gaussian clustering, the PTM models have ▮▮▮ larger numbers of mixture weights than the state-clustered models, as shown in Table 1. We used the mixture weight averaging scheme to reduce the number of mixture weights in the models. In the ▮▮ experiment, we applied mixture weight averaging on the large PTM model (P1788) and observed the word error rate and number of mixture weights for different averaging thresholds. We plot the word error rate against the number of mixture weights in Figure 3. We see that a factor of 10 reduction in mixture weights is achieved with almost no degradation in accuracy. ▮▮▮ the word error rate changes from 39.6% to 39.7% when the number of mixture weights goes from 36.2 million to 3.4 million. Further decreasing the number of mixture weights to 1.3 million increases the word error rate to 40.8%.

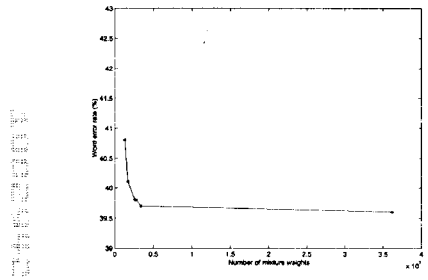

Figure 3: Word error rate vs. number of mixture weights

The mixture weight averaging scheme can be used to reduce the mixture weights for all models (not just the PTM models). By varying the threshold individually for each model, we computed the number of mixture weights needed for each model to achieve a word error rate of about 40.5% (this is the word error rate for the baseline G36 state-clustered model). Table 2 shows these results. We see that a non-zero threshold was used for all models, showing a reduction in mixture weights for all cases. For comparison, Table 1 shows the number of mixture weights before applying the reduction algorithm. Table 2 shows that G128 has the smallest number of mixture weights. CLS13K has fewer mixture weights than the baseline, G36; however it has a factor of 5 fewer Gaussians because of per-phone Gaussian clustering. We have not applied Gaussian clustering to G128; this could result in a ▮▮▮ decrease in number of Gaussians as in CLS13K, and also a further decrease in the number of mixture weights. Our results show that combination of Gaussian clustering and mixture weight averaging can ▮▮▮ decrease model size with only a small degradation in accuracy.

| Model | Threshold | Number of mixture weights (millions) | WER (%) |
|---|---|---|---|
| G36 | 0.01 | 0.6 | 40.3 |
| G128 | 0.035 | 0.09 | 40.7 |
| P1788 | 0.0025 | 1.5 | 40.5 |
| C13K | 0.01 | 0.40 | 40.5 |

Table 2: Comparison of mixture weight averaging for different models

6. Summary and Conclusions

We presented a new parameter tying approach where the number of state clusters is drastically reduced from the number in standard state-clustered HMMs. In particular, we showed that using PTM models results in accuracy similar to that of state-clustered models, but with less computation during recognition, thus leading to a recognition speedup. We described a per-phone Gaussian clustering algorithm that decreases the number of Gaussians by more than a factor of 5 with no degradation in accuracy. Finally, we presented experiments with a mixture weight reduction algorithm that reduces the number of weights by a factor of 10 or more with no degradation in accuracy. By combining these three techniques, we created a PTM model with more than a factor of 5 fewer Gaussians than corresponding state-clustered systems, and a similar number of mixture weights (CLS13K). In addition, the PTM model gave almost the same accuracy as the state-clustered models, but with lesser computation during recognition.

References

1. "Proceedings of the DARPA Speech Recognition Workshop," 1998.
2. Ananth Sankar, "A New Look at HMM Parameter Tying for Large Vocabulary Speech Recognition," in *Proceedings of IC-SLP*, (Sydney, Australia), 1998.
3. A. Sankar, R. R. Gadde, and F. Weng, "SRI's 1998 Broadcast News System – Toward Faster, Smaller, Better Speech Recognition," in *Proceedings of the DARPA Broadcast News Workshop*, (Washington, D.C.), 1999.
4. V. Digalakis, P. Monaco, and H. Murveit, "Genones: Generalized Mixture Tying in Continuous Hidden Markov Model-Based Speech Recognizers," *IEEE Transactions on Speech and Audio Processing*, vol. 4, no. 4, pp. 281–289, 1996.
5. S. Gupta, F. Soong, and R. Hami-Cohen, "Quantizing Mixture Weights in a Tied-Mixture HMM," in *Proceedings of ICSLP*, pp. 1828–1831, 1996.
6. F. Weng, A. Stolcke, and A. Sankar, "New Developments in Lattice-based Search Strategies in SRI's H4 system," in *Proceedings of DARPA Speech Recognition Workshop*, (Lansdowne, VA), February 1998.

tering, the PTM models have significantly larger numbers of mixture weights than the state-clustered models, as shown in Table 1. We used the mixture weight averaging scheme to reduce the number of mixture weights in the models. In the first experiment, we applied mixture weight averaging on the large PTM model (P1788) and observed the word error rate and number of mixture weights for different averaging thresholds. We plot the word error rate against the number of mixture weights in Figure 3. We see that a factor of 10 reduction in mixture weights is achieved with almost no degradation in accuracy. Specifically, the word error rate changes from 39.6% to 39.7% when the number of mixture weights goes from 36.2 million to 3.4 million. Further decreasing the number of mixture weights to 1.3 million increases the word error rate to 40.8%.

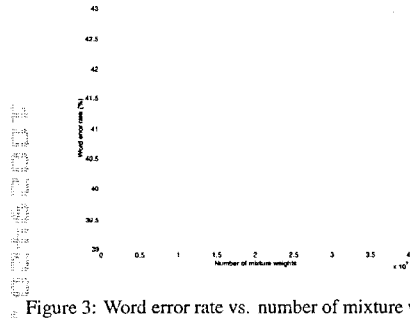

Figure 3: Word error rate vs. number of mixture weights

The mixture weight averaging scheme can be used to reduce the mixture weights for all models (not just the PTM models). By varying the threshold individually for each model, we computed the number of mixture weights needed for each model to achieve a word error rate of about 40.5% (this is the word error rate for the baseline G36 state-clustered model). Table 2 shows these results. We see that a non-zero threshold was used for all models, showing a reduction in mixture weights for all cases. For comparison, Table 1 shows the number of mixture weights before applying the reduction algorithm. Table 2 shows that G128 has the smallest number of mixture weights. CLS13K has fewer mixture weights than the baseline, G36; however it has a factor of 5 fewer Gaussians because of per-phone Gaussian clustering. We have not applied Gaussian clustering to G128; this could result in a significant decrease in number of Gaussians as in CLS13K, and also a further decrease in the number of mixture weights. Our results show that combination of Gaussian clustering and mixture weight averaging can significantly decrease model size with only a small degradation in accuracy.

| Model | Threshold | Number of mixture weights (millions) | WER (%) |
|-------|-----------|--------------------------------------|---------|
| G36   | 0.01      | 0.6                                  | 40.3    |
| G128  | 0.035     | 0.09                                 | 40.7    |
| P1788 | 0.0025    | 1.5                                  | 40.5    |
| C13K  | 0.01      | 0.40                                 | 40.5    |

Table 2: Comparison of mixture weight averaging for different models

6. Summary and Conclusions

We presented a new parameter tying approach where the number of state clusters is drastically reduced from the number in standard state-clustered HMMs. In particular, we showed that using PTM models results in accuracy similar to that of state-clustered models, but with less computation during recognition, thus leading to a recognition speedup. We described a per-phone Gaussian clustering algorithm that decreases the number of Gaussians by more than a factor of 5 with no degradation in accuracy. Finally, we presented experiments with a mixture weight reduction algorithm that reduces the number of weights by a factor of 10 or more with no degradation in accuracy. By combining these three techniques, we created a PTM model with more than a factor of 5 fewer Gaussians than corresponding state-clustered systems, and a similar number of mixture weights (CLS13K). In addition, the PTM model gave almost the same accuracy as the state-clustered models, but with lesser computation during recognition.

References

1. "Proceedings of the DARPA Speech Recognition Workshop," 1998.
2. Ananth Sankar, "A New Look at HMM Parameter Tying for Large Vocabulary Speech Recognition," in *Proceedings of ICSLP*, (Sydney, Australia), 1998.
3. A. Sankar, R. R. Gadde, and F. Weng, "SRI's 1998 Broadcast News System – Toward Faster, Smaller, Better Speech Recognition," in *Proceedings of the DARPA Broadcast News Workshop*, (Washington, D.C.), 1999.
4. V. Digalakis, P. Monaco, and H. Murveit, "Genones: Generalized Mixture Tying in Continuous Hidden Markov Model-Based Speech Recognizers," *IEEE Transactions on Speech and Audio Processing*, vol. 4, no. 4, pp. 281–289, 1996.
5. S. Gupta, F. Soong, and R. Hami-Cohen, "Quantizing Mixture Weights in a Tied-Mixture HMM," in *Proceedings of ICSLP*, pp. 1828–1831, 1996.
6. F. Weng, A. Stolcke, and A. Sankar, "New Developments in Lattice-based Search Strategies in SRI's H4 system," in *Proceedings of DARPA Speech Recognition Workshop*, (Lansdowne, VA), February 1998.

SRI's 1998 Broadcast News System – Toward Faster, Better, Smaller Speech Recognition[*]

*Ananth Sankar, Ramana Rao Gadde and Fuliang Weng*

Speech Technology and Research Laboratory
SRI International
333 Ravenswood Avenue
Menlo Park, CA 94025

ABSTRACT

We describe several new research directions we investigated toward the development of our broadcast news transcription system for the 1998 DARPA H4 evaluations. Our goal was to develop significantly faster and smaller speech recognition systems without degrading the word error rate of our 1997 system. We did this through significant algorithmic research creating various new techniques. A sample of these techniques was used to put together our 1998 broadcast news system, which is conceptually much simpler, faster, and smaller, but gives the same word error rate as our 1997 system. In particular, our 1998 system is based on a simple phonetically tied mixture (PTM) model with a total of only 13,000 Gaussians, as compared to a 67,000-Gaussian state-clustered system we used in 1997.

1. Introduction

One of our main goals in 1998 was to significantly increase speed and decrease model size, while maintaining or improving accuracy. These goals are difficult to achieve simultaneously because of inherent trade-offs. Decreasing the number of system parameters will typically degrade accuracy. Similarly increasing the speed by eliminating search passes, or decreasing the pruning beamwidth during the decoding stage, will degrade accuracy. We decided, therefore, that to achieve simultaneous improvements in speed, size, and accuracy, we would have to significantly alter our approach by focusing on novel algorithms. We developed and studied several new algorithms for acoustic modeling, adaptation, and lattice generation. A sample of these methods was incorporated into our 1998 broadcast news system. However, we were unable to incorporate all the methods we developed because of time and resource constraints. The resulting system was significantly simpler and faster than our 1997 system.

In this paper, we summarize the various new techniques we developed, along with experimental results. We then briefly describe our 1998 broadcast news evaluation system and give experimental results for 1996 H4 partitioned evaluation (PE) development test data and the 1998 DARPA H4 evaluation data. Finally, we summarize work we did after the 1998 evaluation to further improve our system performance.

[*]This work was sponsored by DARPA through the Naval Command and Control Ocean Surveillance Center under contract N66001-94-C-6048.

2. Improved Parameter Tying

Most current state-of-the-art speech recognition systems are based on state-clustered hidden Markov models (HMMs). However, the significant overlap of state clusters in acoustic space leads to potential problems. The data in the cluster overlap regions is divided between clusters, giving less robust Gaussian estimates. Gaussians from each state cluster may also overlap with each other, causing redundancy and a waste of parameters. These modeling problems can be easily handled by decreasing the number of clusters and appropriately increasing the number of Gaussians per cluster [1]. We also expect a recognition speed-up because of significant savings in Gaussian computation due to the smaller variances of the Gaussians [1] when state clusters are merged. In our approach, we used a PTM system with only 40 state clusters, and a large number of Gaussians per class.

Table 1 shows that the new PTM approach gave significantly lower word error rate (WER) than a state-clustered system on two Wall Street Journal (WSJ) test sets, and a North American Business News (NABN) test set, using a 20,000-word bigram language model (LM). The state-clustered system had 937 clusters, while the PTM system used 40 phone classes. Both systems had a total of about 30,000 Gaussians.

| System | Word Error Rate (%) | | |
|---|---|---|---|
| | WSJ1 | WSJ2 | NABN |
| State-clustered | 21.65 | 14.08 | 18.29 |
| PTM | 20.49 | 12.58 | 16.78 |

Table 1: Word error rates for different levels of tying

Figures 1 and 2 plot the word error rate against the number of Gaussians computed and the recognition time, respectively. Each point on the curve is for a different value of the pruning beamwidth in our Viterbi search. At a word error rate of 22%, the PTM system computes half the number of Gaussians. Also, the PTM system achieves this accuracy with a smaller pruning beamwidth, thus resulting in significantly fewer active hypotheses in the search. The resulting speed-up for the PTM system is a factor of 5.

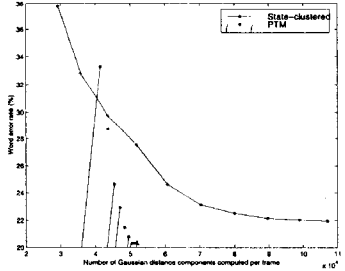

Figure 1: Word error vs. number of Gaussian distance components computed

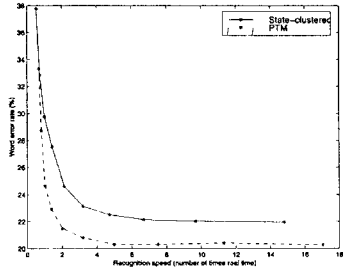

Figure 2: Word error vs. recognition speed

3. Phone-level Gaussian Clustering

In the PTM approach, we must use a much larger number of Gaussians per state cluster than in previous state-clustered systems. However, some phone classes may have very little acoustic variability and thus may need only a few Gaussians for good modeling. For example, the nasal /ng/ is less variable than the unvoiced stop /t/.

We exploited this fact by developing a per-phone Gaussian clustering algorithm that automatically determines the number of Gaussians per phone based on the measured acoustic variability. To measure a phone's acoustic variability, we agglomeratively cluster the HMM states for each phone, using a weighted-by-counts entropy distance between the mixture weight distributions of each state [2]. Clustering is stopped when the average distance reaches a pre-specified relative threshold. The number of resulting state clusters is a measure of a phone's acoustic variability. In our study, the number of Gaussians for a phone was proportional to the acoustic variability, with a pre-set minimum and maximum number of Gaussians.

Table 2 shows the word error rate on the 1996 H4 PE development test set and the number of Gaussians for three different female models trained on the first 100 hours of H4 training data. These recognition runs used a 48,000-word bigram LM. 1997—eval is a state-clustered model we used for the 1997 DARPA H4 evaluations. PTM—1788 is a PTM model with 1788 Gaussians per phone class, and Clustered—PTM is a model created by applying the per-phone Gaussian clustering algorithm to PTM—1788. From the table, we see that the PTM and state-clustered systems gave the same word error rate. A factor of 5 reduction in the number of Gaussians was achieved using the per-phone Gaussian clustered PTM model, with no difference in the word error rate. The drastic reduction in Gaussians also decreases the amount of computation during recognition.

| Model | Word (%) Error | Number of Gaussians |
|---|---|---|
| 1997-eval | 39.4 | 67,200 |
| PTM-1788 | 39.7 | 69,732 |
| Clustered-PTM | 39.3 | 12,758 |

Table 2: Word error rates and number of Gaussians for different models

4. Mixture Weight Reduction

One problem with our PTM modeling approach is that the mixture weight distributions for each state can become very large because of the large number of Gaussians per phone class. However, since only a few Gaussians will be active for each HMM state, we can more efficiently represent the weights. We examined two recently published schemes to reduce the number of mixture weights in our PTM models [3]. In the first, called the "Zeroing" scheme, we set all mixture weights below a threshold to zero and renormalize the mixture weights. In the second, called the "Averaging" scheme, we set each mixture weight below the threshold to a value equal to the average of all mixture weights below the threshold.

Experimental results showed that the Zeroing scheme worked for small thresholds, but rapidly deteriorated as the threshold was increased. However, the Averaging scheme maintained a low word error rate even for large thresholds, resulting in a factor of 16 reduction in the number of mixture weights with no degradation in accuracy.

5. Tied-transform HMMs

We developed a new modeling and training algorithm called the tied-transform ($T^2$) HMM, which gives robust estimates for systems with a large number of Gaussians [4]. The basic idea is illustrated in Figure 3, which shows an HMM state-cluster tree. Suppose our goal is to train an HMM for the larger number of state clusters $N$. However, we do not have enough data to robustly estimate each Gaussian in this large system. We solve this problem by training an HMM for the smaller number of state clusters $M$, for which we assume that we have enough data to robustly estimate each Gaussian. The Gaussians in the state clusters of the larger HMM are transformed versions of the Gaussians in the ancestor state clusters in the smaller HMM, where the transformations are estimated as in maximum-likelihood adaptation [5, 6, 7, 8].

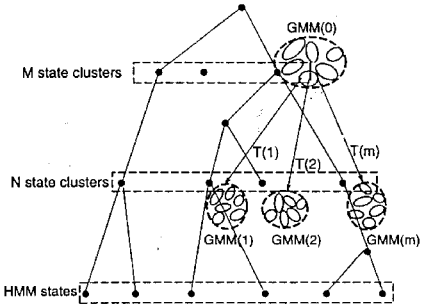

Figure 3: Illustration of $T^2$-HMM

Experimental results showed that the $T^2$-HMM method gave significant improvement in word accuracy in our experiments with state-clustered HMMs [4]. However, we did not use this algorithm in our 1998 broadcast news evaluation system because of a lack of time.

6. Fast Adaptation

To speed up our system, we developed various engineering solutions to decrease the computation cost for our maximum-likelihood (ML) transformation-based adaptation algorithms. We also proposed a new adaptation algorithm called "Basis Transform Adaptation", which can be advantageously used when the amount of adaptation data is small.

Most ML transformation-based adaptation algorithms [5, 6, 7, 8] involve three steps: (1) computing sufficient statistics for all Gaussians in the model, (2) estimation of transform statistics from the Gaussian statistics, and (3) estimation of the transform from the transform statistics. We examined the computations involved in these three steps and observed that the first two steps take most of the adaptation time. Hence, we investigated ways to reduce the computation for each of these steps.

Use of Viterbi alignments instead of the usual forward-backward algorithm to compute the Gaussian statistics gave a factor of 4 speed-up with no loss of accuracy. To reduce the time for estimation of transform statistics, we used a threshold on the Gaussian counts to decide which Gaussians would be used. Only Gaussians with counts higher than the threshold are used to compute transform statistics. We experimented with a number of thresholds and found that a threshold of 0.1 on the Gaussian counts reduced the time by 40% with no loss of accuracy. Higher thresholds reduced the time further, but degraded accuracy. These results are shown in Table 3.

| Threshold | WER (%) | Adaptation Speed(X RT) |
|---|---|---|
| 0.0 | 29.18 | 1.6 |
| 0.1 | 29.16 | 1.0 |
| 0.5 | 29.30 | 0.9 |
| 1.0 | 29.58 | 0.75 |

Table 3: Results of Gaussian thresholding

A different scheme we investigated used smaller models to compute the adaptation transforms and applied them on larger models. Since the smaller models have fewer Gaussians, adaptation time is decreased. In our experiments, we were able to reduce the adaptation time by nearly 45% with practically no change in accuracy with some model combinations. However, as these results were not consistent across all model combinations, we did not use this scheme in our 1998 evaluation system.

We also developed a new method called "Basis transform adaptation", which has significant speed advantages over ML transformation-based techniques like ML linear regression (MLLR). The adaptation transform for the test speaker is a weighted combination of a set of basis transforms. The basis transforms are trained using the training data; during testing, we only estimate the small number of combination weights. Thus, this approach can give much faster adaptation. In our approach, we estimated the combination weights by maximizing the likelihood of the adaptation data.

We compared the performance of basis transform adaptation with MLLR adaptation using a state-clustered HMM model with 252 state clusters and 128 Gaussians per state cluster. The models were trained on a 71-speaker subset of the WSJ male training set. We estimated affine transforms of the Gaussian means for 46 training speakers and used them as basis transforms. We did supervised adaptation on 10 test speakers using the 40 common adaptation sentences. The results, in Table 4, show that the basis transform method performs as well as MLLR for small amounts of adaptation data; however, as more data becomes available, MLLR performs better.

We then experimented with unsupervised transcription-based adaptation done on each sentence of the same test set. The results, in Table 5, again show that the basis-transform approach and MLLR give the same results. The advantage of the basis-transform adaptation algorithm over MLLR is the

| Model | #adapt. sentences(#transforms) | | | | |
|---|---|---|---|---|---|
| | 1(1) | 2(1) | 5(2) | 10(5) | 20(50) |
| SI | 22.8 | 22.8 | 22.8 | 22.8 | 22.8 |
| MLLR | 22.4 | 21.7 | 21.0 | 20.9 | 20.2 |
| Basis Transform | 21.8 | 21.9 | 21.8 | 21.2 | 21.3 |

Table 4: Comparison of MLLR and Basis Transform adaptation (supervised adaptation)

speed-up we expect because only a very few parameters are estimated during testing.

| Model | WER(%) |
|---|---|
| SI | 22.8 |
| MLLR | 21.7 |
| Basis Transform | 21.8 |

Table 5: Comparison of MLLR and Basis Transform adaptation (unsupervised adaptation)

7. Lattice Algorithms

In SRI's 1998 multipass broadcast news transcription system, word lattices are used as an intermediate representation. To achieve efficiency and accuracy, we want to have small lattices with a low lattice error rate. We tested two bigram lattice reduction algorithms that we recently developed. These are the exact and approximate reduction algorithms [9], which gave a 50% and 67% size reduction, respectively, over the original bigram lattices. The approximate reduction algorithm also gave a 6% and 34% lower lattice error for F0 and F1 conditions. Compared with the standard finite state machine (FSM) determinization and minimization algorithms implemented by AT&T, our two algorithms produced lattices with 8% and 39% smaller sizes. These results are shown in Table 6. For the 1998 evaluations, we used the exact reduction algorithm.

| | SIZE | | LER | |
|---|---|---|---|---|
| | F0 | F1 | F0 | F1 |
| Baseline | 11624 | 16208 | 3.3% | 10.0% |
| FSM Det/Min | 6417 | 8715 | 3.3% | 10.0% |
| Exact Red | 6129 | 7797 | 3.3% | 10.0% |
| Approx Red | 4318 | 4985 | 3.1% | 6.6% |

Table 6: Sizes and lattice error rates of the reduction algorithms

Trigram LMs were incorporated by expanding the reduced bigram lattices to trigram lattices, using our recently developed compact trigram expansion algorithm [10]. Comparative experimental results show that our compact trigram expansion algorithm gives more than 50% smaller lattices than those generated by the AT&T FSM tools [9]. In addition, our compact trigram expansion is 10 times faster than the conventional trigram expansion with no accuracy degradation.

8. Confidence-based Language Modeling

Error analysis on Switchboard data shows that the LM is more likely to predict a word incorrectly when the previous word is incorrect than if the previous word were correct [11]. This intuitive fact can be exploited to develop better LMs. If we knew a hypothesized word was incorrect, we would not compute the probability for the next word conditioned on it. Instead, it would make more sense to back off to the unigram probability if we knew the previous word was wrong. Automatically detecting which words are incorrect is challenging. One approach is to use acoustic confidence scores as evidence to judge the correctness of a word. The proposed confidence-based language model (CBLM) computes the word n-gram probability as follows. For simplicity, we use a trigram LM as an example:

$$\begin{aligned} P^*(w_3 \mid w_2 w_1) &= P(X_2 = 1, X_1 = 1) * P(w_3 \mid w_2 w_1) \\ &+ P(X_2 = 1, X_1 = 0) * P(w_3 \mid w_2) \\ &+ P(X_2 = 0) * P(w_3) \end{aligned}$$

where, $X_i$, $i = 1, 2$, are random variables indicating the correctness of $w_i$. Thus, $$X_i = \begin{cases} 1 & \text{if } w_i \text{ is correct} \\ 0 & \text{if } w_i \text{ is incorrect.} \end{cases}$$

We can interpret the probabilities as confidence measures for the correctness of the hypothesized words. To get an estimate of the maximum improvement from this approach, we designed a "cheating" experiment [12]. In this experiment, we assume that the correctness of all the words in the n-best hypotheses is known, therefore giving perfect confidence scores. Based on this information, the trigram probability is used if both previous words are correct; the bigram probability is used if the nearest word in the history is correct; and otherwise, the unigram probability is used. A similar experiment with bigrams was also conducted to observe the consistency of the results. These LMs were used to attach LM scores to the entries in the n-best list, and the hypothesis with the maximum combined acoustic and LM score was selected. The bigram and trigram results are shown in Table 7. In both cases, more than 1% absolute improvement was obtained on the 1996 H4 development test data. The n-best error rate was about 18%. It is possible that we would get even higher gains if we used lattices to do this experiment.

| Model | conventional | confidence-based |
|-------|--------------|------------------|
| bigram | 36.8% | 35.7% |
| trigram | 33.4% | 32.3% |

Table 7: Word error rates of confidence-based n-gram

This initial experiment shows a potentially moderate improvement, using CBLM. Future research is needed to apply real acoustic confidence measures on lattices to further verify the idea.

9. Confidence-based Optimization

In our 1997 H4 experiments, we observed that sentences with smaller lattices usually have lower word error rates, probably because smaller lattices indicate lower confusability. We conducted a set of experiments on the 1996 H4 PE development data to see whether tuning LM weights based on lattice sizes would give us any gain.

Two sets of experiments were designed, each dividing the whole development test set into four subgroups. The first experiment divides the test set based on normalized lattice sizes. The normalized lattice size was estimated by dividing the number of transitions by the number of nodes in a lattice. The other experiment randomly divides the data into four subgroups. A 0.3% absolute improvement was derived using the lattice size to determine separate LM weights. However, tuning the LM weights to four randomly selected lattice groups gave an improvement of 0.18%. The LMs tuned to the size-based partitions did not perform much better than those tuned to random partitions. This could imply that using multiple partitions has the effect of tuning the LM to the development data, and that these results may not carry through to evaluation data. We did not pursue this work further at this time.

10. Broadcast News System and Experimental Results

We will not give a detailed description of the system, but refer the reader to the description available in NIST's Web page [13]. Instead, we list the novel features and algorithms used in our 1998 system along with the sections in this paper which describe them:

1. Novel parameter tying (Section 2)

2. Per-phone Gaussian clustering (Section 3)

3. Adaptation speed-ups (Section 6)

4. New lattice generation (Section 7)

We used the new acoustic modeling techniques to configure a per-phone Gaussian clustered PTM system with a total of only 13,000 Gaussians. We developed two systems–a hub system for which processing time was not a constraint, and a spoke system, which ran in 10 times real time. The main difference between the hub and spoke systems was tighter pruning and the elimination of one acoustic adaptation and recognition stage for the spoke.

Table 8 gives the word error rates on the 1996 H4 PE development test set using our 1997 evaluation system, the 1998 hub system, and the 1998 10 times real-time spoke system. We see that the 1997 and 1998 systems gave almost identical error rates. However, our 1998 13,000-Gaussian PTM system is clearly far simpler than our 67,000-Gaussian state-clustered system of 1997. Table 9 gives the word error rates for the

| System | Word Error (%) |
|--------|----------------|
| 1997 SRI eval | 26.1 |
| 1998 SRI H4 Hub | 26.7 |
| 1998 SRI H4 10XRT Spoke | 28.8 |

Table 8: Word error on 1996 PE development test set two 1998 H4 evaluation data test sets (S1 and S2) using our hub and spoke systems. The 10 times real-time system gave relatively minor degradation compared to the hub system.

| System | Word Error (%) | |
|--------|---|---|
| | S1 | S2 |
| 1998 SRI H4 Hub | 22.1 | 20.1 |
| 1998 SRI H4 10XRT Spoke | 23.4 | 22.2 |
| Degradation over Hub system | 5.9% | 10.4% |

Table 9: Word error on 1998 H4 evaluation test set

11. Post-evaluation Experiments

Based on our experimental results, we believe we have made very good progress toward our goal of developing significantly faster and smaller systems with no degradation in word error. However, because of a lack of time, we were unable to try various existing techniques published in the literature, and to tune our system to attain its lowest possible error rate. Also, we used only the first 100 hours of training data to train our acoustic models, rather than the available 200 hours of data. After the evaluation, we addressed some of these issues. In particular, we 1. Trained our system on 200 hours of data 2. Tuned the number of parameters more carefully 3. Implemented a diagonalizing tied covariance transform [14]

4. Used BBN's 1998 evaluation segments [15] to evaluate our own segmentation algorithm We evaluated our segmentation algorithm by running our spoke system on the 1998 evaluation data using our own segments and those we got from BBN. We found that using BBN's segments gave us 1.4% and 0.9% absolute improvements in word error rate for the S1 and S2 evaluation test sets, respectively, showing that there is room for improvement in our segmentation algorithm.

We then configured a 30,000-Gaussian PTM system using the same approach used for the evaluation system, but with the additional post-evaluation improvements. We used this system to run a 10 times real time spoke test on the evaluation data. Table 10 gives the word error rates for the 10 times real time spoke task for our evaluation system, and the post-evaluation system. A significant improvement was achieved using the post-evaluation system. We note that this system has more Gaussians than the evaluation system, but the number of Gaussians is still significantly smaller than other state-of-the-art systems.

| System | Word Error (%) | |
|---|---|---|
| | S1 | S2 |
| 1998 SRI H4 10XRT Spoke | 23.4 | 22.2 |
| Post-eval 10XRT Spoke | 21.3 | 19.7 |
| Improvement over eval system | 9.0% | 11.3% |

Table 10: Comparison of evaluation and post-evaluation Spoke systems

12. Summary and Conclusion

We developed many new techniques for the 1998 DARPA H4 evaluations. Our main focus was to drastically decrease recognition time and model size while not compromising the accuracy. Toward this goal, we made good progress, creating a simple 13,000-Gaussian PTM system that performed as well as our more complex 1997 state-clustered system with 67,000 Gaussians. By using BBN's segments, and a larger 30,000-Gaussian PTM system trained on all the available training data, a further improvement of about 10% was achieved. The new technologies that were used include a new parameter tying method, a per-phone Gaussian clustering algorithm, fast adaptation algorithms, and new lattice reduction and representation algorithms.

Acknowledgements

We thank Andreas Stolcke for training the language models we used. We also thank Long Nguyen of BBN and Ramesh Gopinath of IBM for providing their 1998 evaluation segments for our post-evaluation analysis.

References

1. Ananth Sankar, "A New Look at HMM Parameter Tying for Large Vocabulary Speech Recognition," in *Proceedings of ICSLP*, (Sydney, Australia), 1998.
2. V. Digalakis, P. Monaco, and H. Murveit, "Genones: Generalized Mixture Tying in Continuous Hidden Markov Model-Based Speech Recognizers," *IEEE Transactions on Speech and Audio Processing*, vol. 4, no. 4, pp. 281–289, 1996.
3. S. Gupta, F. Soong, and R. Hami-Cohen, "Quantizing Mixture Weights in a Tied-Mixture HMM," in *Proceedings of ICSLP*, pp. 1828–1831, 1996.
4. Ananth Sankar, "Robust HMM Estimation with Gaussian Merging-Splitting and Tied-Transform HMMs," in *Proceedings of ICSLP*, (Sydney, Australia), 1998.
5. A. Sankar and C.-H. Lee, "Stochastic Matching for Robust Speech Recognition," *IEEE Signal Processing Letters*, vol. 1, pp. 124–125, August 1994.
6. A. Sankar and C.-H. Lee, "A Maximum-Likelihood Approach to Stochastic Matching for Robust Speech Recognition," *IEEE Transactions on Speech and Audio Processing*, vol. 4, pp. 190–202, May 1996.
7. V. Digalakis, D. Rtischev, and L. Neumeyer, "Speaker Adaptation Using Constrained Reestimation of Gaussian Mixtures," *IEEE Transactions on Speech and Audio Processing*, vol. 3, no. 5, pp. 357–366, 1995.
8. C. J. Legetter and P. C. Woodland, "Flexible Speaker Adaptation Using Maximum Likelihood Linear Regression," in *Proceedings of the Spoken Language Systems Technology Workshop*, pp. 110–115, 1995.
9. F. Weng, A. Stolcke, and A. Sankar, "Efficient Lattice Representation and Generation," in *Proceedings of ICSLP*, (Sydney, Australia), 1998.
10. F. Weng, A. Stolcke, and A. Sankar, "New Developments in Lattice-based Search Strategies in SRI's H4 system," in *Proceedings of DARPA Speech Recognition Workshop*, (Lansdowne, VA), February 1998.
11. C. Neti, S. Roukos, and E. Eide, "Word-Based Confidence Measures as a Guide for Stack Search in Speech Recognition," in *Proceedings IEEE International Conference on Acoustics, Speech, and Signal Processing*, 1997.
12. Hierarchical Consistency Modeling for Next-Generation Speech Recognition–quarterly progress report covering the period March 15, through June 1, 1997, *submitted to DARPA*.
13. ftp://jaguar.ncsl.nist.gov/csr98/ h4e_98_official_scores_981125/readme.html.
14. Mark Gales, "Semi-Tied Full-Covariance Matrices for Hidden Markov Models," Tech. Rep. CUED/F-INFENG/TR 287, Cambridge University, April 1997.
15. S. Matsoukas, L. Nguyen, J. Davenport, J. Billa, F. Richardson, D. Liu, R. Schwartz, and J. Makhoul, "The 1998 BBN BYBLOS Primary System Applied to English and Spanish Broadcast News Transcription," in *Proceedings of the DARPA Broadcast News Workshop*, (Washington, D.C.), 1999.

What is claimed:

1. In a speech recognition system using a method for recognizing human speech, the method comprising the steps of:

selecting a model to represent a selected subunit of speech, the model having associated with it a plurality of states;

determining states that may be represented by a set of simple probability functions; and clustering said states that may be represented by a set of simple probability functions into a limited number of clusters, wherein said simple probability functions for each of said limited number of state clusters is greater in number than said limited number of state clusters.

2. The method according to claim 1 wherein the number of clusters is kept low to improve processing speed while the number of simple probability functions per cluster is increased for greater recognition accuracy.

3. The method according to claim 1 wherein the number of clusters is between approximately 40 and 200 and wherein at least one cluster has assigned to it 500 to 2000 simple probability functions.

4. The method according to claim 1 wherein the number of clusters is more than 10 and wherein the ratio of the number of clusters to the total number of simple probability functions in the system is less than 0.002.

5. The method according to claim 1 wherein the number of clusters is more than 9 and at least one cluster has more than approximately 1,000 simple probability functions.

6. The method according to claim 1 wherein the simple probability functions are Gaussians.

7. The method according to claim 1 wherein different numbers of simple probability functions are used in different clusters.

8. The method according to claim 7 wherein the number of simple probability functions used for a particular cluster is determined by a training algorithm.

9. The method according to claim 7 wherein the number of simple probability functions used for a particular cluster is indicated by a human system designer.

10. The method according to claim 1 wherein the number of said clusters is equal to the number of phones in the system.

11. The method according to claim 1 wherein the model is a three-state Hidden Markov Model.

12. The method according to claim 1 wherein states are clustered according to an agglomerative hierarchical clustering scheme.

13. The method according to claim 1 wherein states are clustered so as to nearly eliminate overlap between clusters.

14. The method according to claim 1 further comprising:

caching log-likelihoods for the simple probability functions in a mixture as soon as they are computed for a frame so that if the same mixture needs to be evaluated at that frame for another triphone state, the cache is used.

15. The method according to claim 1 wherein redundant simple probability functions in the state cluster overlap region are more effectively used to cover the acoustic space of the clusters, resulting in smaller variances and a reducing the number of distance components to be computed.

16. The method according to claim 1 further comprising:

reducing the size of a simple probability function shortlists by decreasing the number of state clusters with a corresponding reduction in simple probability function computations.

17. A computer readable medium having stored thereon a plurality of instructions, the plurality of instructions including instructions which, when executed by a processor, cause the processor to perform the steps comprising of:

selecting a model to represent a selected subunit of speech, the model having associated with it a plurality of states;

determining states that may be represented by a set of simple probability functions; and clustering said states that may be represented by a set of simple probability functions into a limited number of clusters, wherein said simple probability functions for each of said limited number of state clusters is greater in number than said limited number of state dusters.

18. A speech recognizer comprising:

a logic processing device;

storage means;

a set of probabilistic models stored in the storage means; said models including a limited number of state clusters, wherein at least one of said limited number of state clusters is represented by a number of simple probability functions, wherein said simple probability functions for each of said limited number of state clusters is greater in number than said limited number of state clusters;

a feature extractor in a computer for extracting feature data capable of being processed by said computer from a speech signal; and recognizing means for matching features from unidentified speech data to the models to produce a most likely path through the models where the path defines the most likely subunits and words in the speech data.

* * * * *